US009785433B2

(12) United States Patent
Espasa et al.

(10) Patent No.: US 9,785,433 B2
(45) Date of Patent: *Oct. 10, 2017

(54) THREE SOURCE OPERAND FLOATING-POINT ADDITION INSTRUCTION WITH OPERAND NEGATION BITS AND INTERMEDIATE AND FINAL RESULT ROUNDING

(71) Applicant: Intel Corporation, Santa Clara, CA (US)

(72) Inventors: Roger Espasa, Barcelona (ES); Guillem Sole, Barcelona (ES); Manel Fernandez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/645,836

(22) Filed: Mar. 12, 2015

(65) Prior Publication Data

US 2015/0286482 A1 Oct. 8, 2015

(30) Foreign Application Priority Data

Mar. 26, 2014 (EP) .................................. 14382106

(51) Int. Cl.
*G06F 9/302* (2006.01)
*G06F 7/485* (2006.01)
*G06F 9/30* (2006.01)

(52) U.S. Cl.
CPC ............ *G06F 9/3001* (2013.01); *G06F 7/485* (2013.01); *G06F 9/3013* (2013.01); *G06F 9/30014* (2013.01); *G06F 9/30016* (2013.01); *G06F 9/30018* (2013.01); *G06F 9/30036* (2013.01); *G06F 9/30145* (2013.01); *G06F 9/30185* (2013.01)

(58) Field of Classification Search
CPC ............... G06F 9/3001; G06F 9/30036; G06F 9/30145; G06F 9/30167; G06F 7/485
See application file for complete search history.

(56) References Cited

U.S. PATENT DOCUMENTS 5,481,686 A 1/1996 Dockser
5,995,122 A * 11/1999 Hsieh .................... H03M 7/24
345/505

(Continued)

FOREIGN PATENT DOCUMENTS

EP 0 976 034 B1 10/2005
TW 561399 B 11/2003
WO 2015/147895 A1 10/2015

OTHER PUBLICATIONS

Intel, "IA-64 Application Developer's Architecture Guide", May 1999, Chapter 5, pp. 5-6 & Chapter 7, pp. 3, 31, and 137.*

(Continued)

*Primary Examiner* — David J Huisman
(74) *Attorney, Agent, or Firm* — Vecchia Patent Agent, LLC

(57) ABSTRACT

A processor includes a decode unit to decode a three source floating point addition instruction indicating a first source operand having a first floating point data element, a second source operand having a second floating point data element, and a third source operand having a third floating point data element. An execution unit is coupled with the decode unit. The execution unit, in response to the instruction, stores a result in a destination operand indicated by the instruction. The result includes a result floating point data element that includes a first floating point rounded sum. The first floating point rounded sum represents an additive combination of a second floating point rounded sum and the third floating point data element. The second floating point rounded sum represents an additive combination of the first floating point data element and the second floating point data element.

19 Claims, 23 Drawing Sheets

(56) References Cited

U.S. PATENT DOCUMENTS

| | | | |
|---|---|---|---|
| 6,029,243 | A | 2/2000 | Pontius et al. |
| 6,094,668 | A | 7/2000 | Oberman |
| 6,288,723 | B1 | 9/2001 | Huff et al. |
| 6,912,557 | B1 | 6/2005 | North et al. |
| 7,139,900 | B2 * | 11/2006 | Gee .................. G06F 9/30014 708/670 |
| 8,239,439 | B2 | 8/2012 | Muff et al. |
| 2002/0184285 | A1 | 12/2002 | Pangal et al. |
| 2002/0194239 | A1 | 12/2002 | Pangal et al. |
| 2003/0167460 | A1 * | 9/2003 | Desai ................ G06F 1/3228 717/151 |
| 2004/0123076 | A1 | 6/2004 | Sheaffer et al. |
| 2007/0300049 | A1 * | 12/2007 | Sodani ............... G06F 9/3016 712/226 |
| 2011/0153993 | A1 * | 6/2011 | Gopal ................ G06F 9/3001 712/221 |
| 2013/0173891 | A1 | 7/2013 | Carlough et al. |

OTHER PUBLICATIONS

International Search report and Written Opinion received for PCT Patent Application No. PCT/US2014/039600, mailed on Dec. 16, 2014, 12 pages.

Office Action received for Taiwanese Patent Application No. 104106247, mailed on Apr. 26, 2016, 11 pages of Office Action including 6 pages of English Translation.

\* cited by examiner

METHOD IN
PROCESSOR
225

RECEIVE THREE SOURCE FLOATING POINT ADDITION INSTRUCTION INDICATING FIRST SOURCE OPERAND HAVING FIRST FLOATING POINT DATA ELEMENT, INDICATING SECOND SOURCE OPERAND HAVING SECOND FLOATING POINT DATA ELEMENT, AND INDICATING THIRD SOURCE OPERAND HAVING THIRD FLOATING POINT DATA ELEMENT — 226

STORE RESULT IN DESTINATION OPERAND IN RESPONSE TO INSTRUCTION, RESULT INCLUDING RESULT FLOATING POINT DATA ELEMENT INCLUDING FIRST FLOATING POINT ROUNDED SUM REPRESENTING ADDITIVE COMBINATION OF SECOND FLOATING POINT ROUNDED SUM AND THIRD FLOATING POINT DATA ELEMENT, THE SECOND FLOATING POINT ROUNDED SUM REPRESENTING ADDITIVE COMBINATION OF FIRST FLOATING POINT DATA ELEMENT AND SECOND FLOATING POINT DATA ELEMENT — 227

FIG. 2

FORMAT OF THREE SOURCE FLOATING POINT ADDITION INSTRUCTION 1002 →

| OPCODE | FIRST SOURCE SPECIFIER | SECOND SOURCE SPECIFIER | THIRD SOURCE SPECIFIER | DEST. SPECIFIER | MASK SPECIFIER | TYPE OF MASKING SPECIFIER | F.P. ROUNDING MODE SPECIFIER | NEGATION CONTROL |
|---|---|---|---|---|---|---|---|---|
| 1060 | 1061 | 1062 | 1063 | 1064 (OPTIONAL) | 1065 (OPTIONAL) | 1066 (OPTIONAL) | 1067 (OPTIONAL) | 1068 (OPTIONAL) |

FIG. 10

NUMBER OF PACKED
DATA OPERATION
MASK BITS
1270

| DATA ELEMENT WIDTH | PACKED DATA WIDTH | | |
|---|---|---|---|
| | 128 BITS | 256 BITS | 512 BITS |
| 16-BIT HP | 8 | 16 | 32 |
| 32-BIT SP | 4 | 8 | 16 |
| 64-BIT DP | 2 | 4 | 8 |

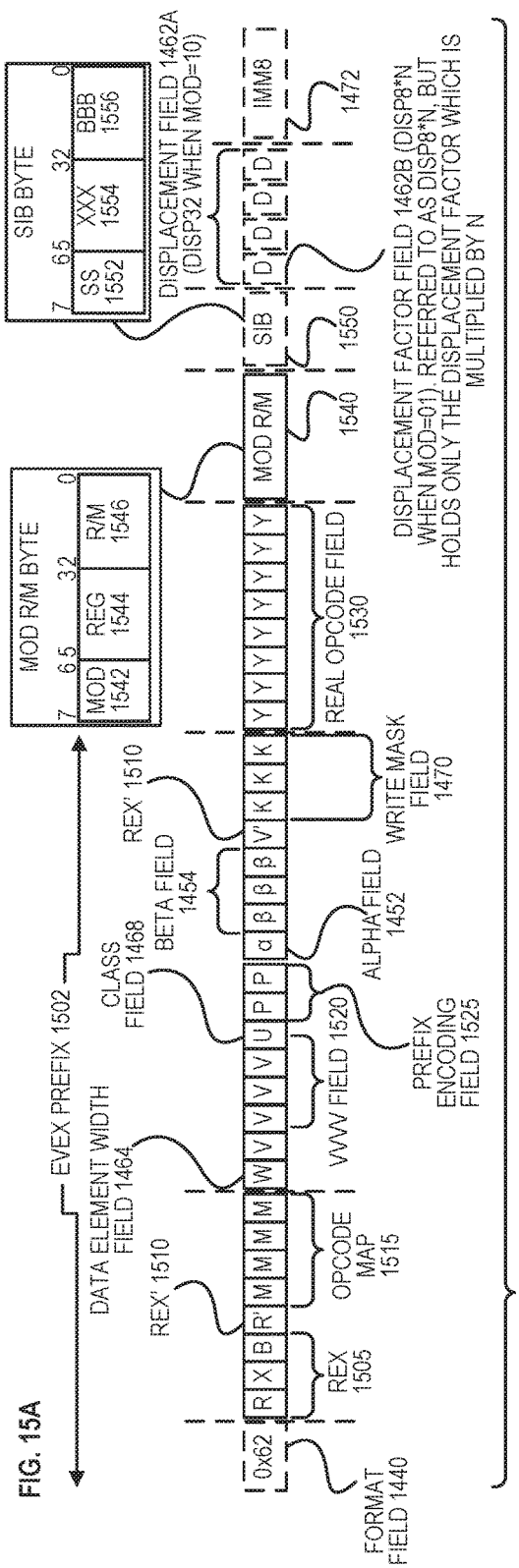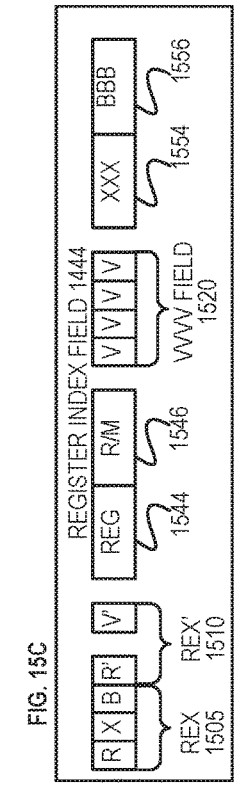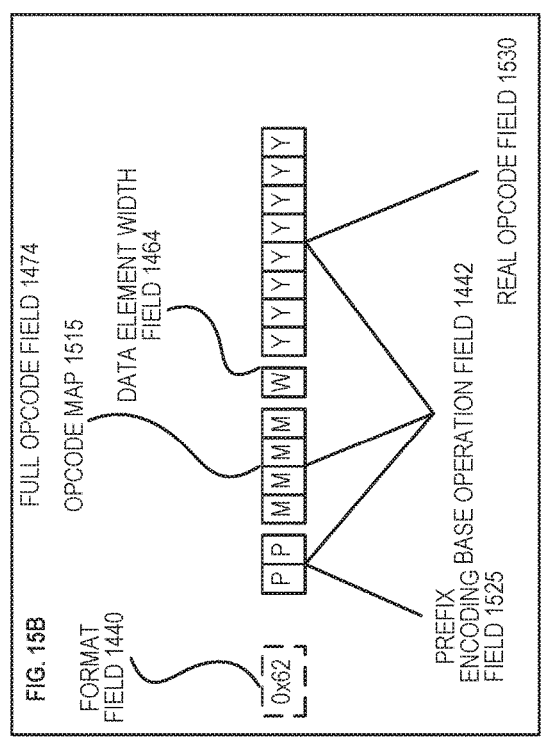

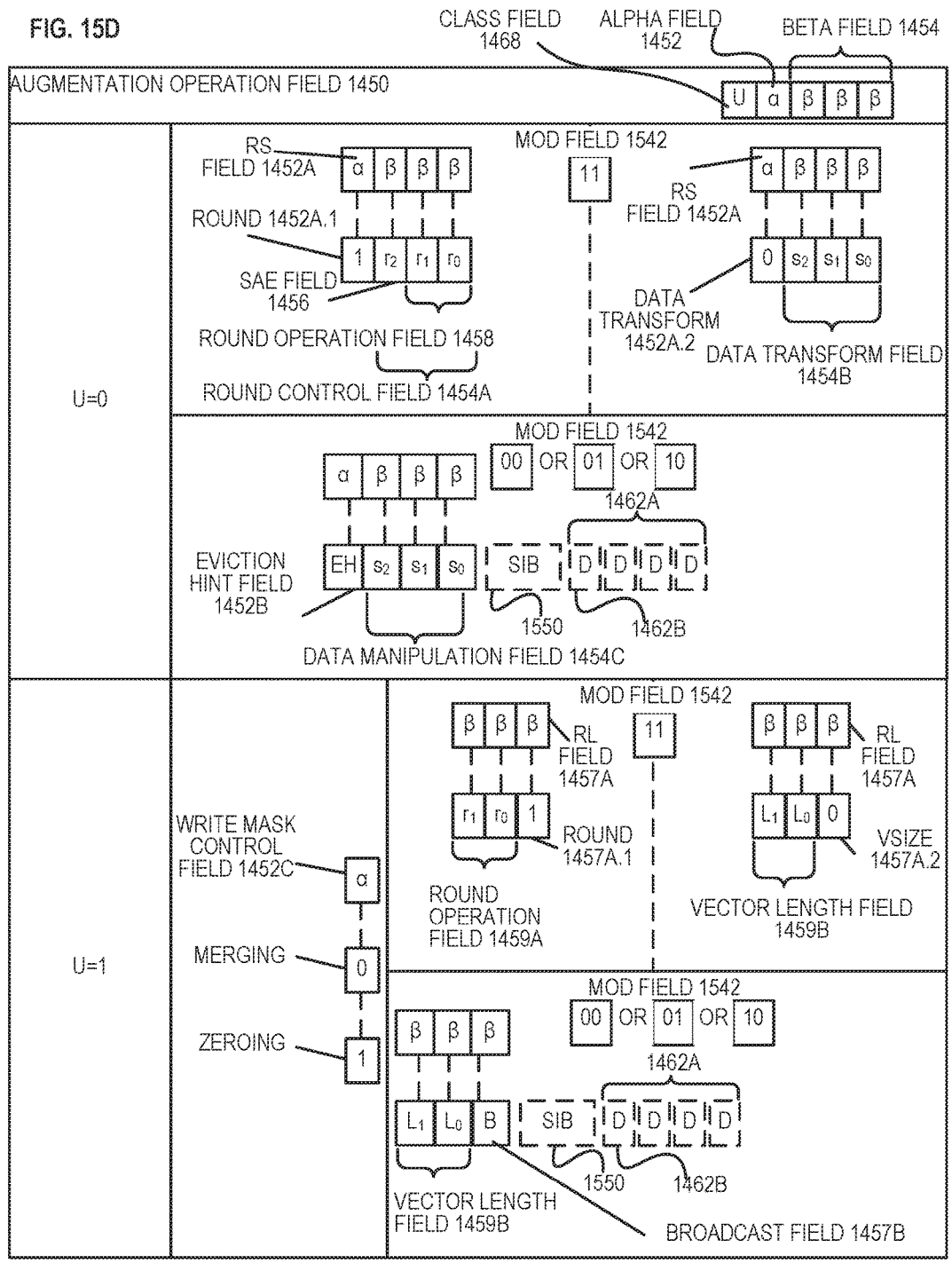

FIG. 16
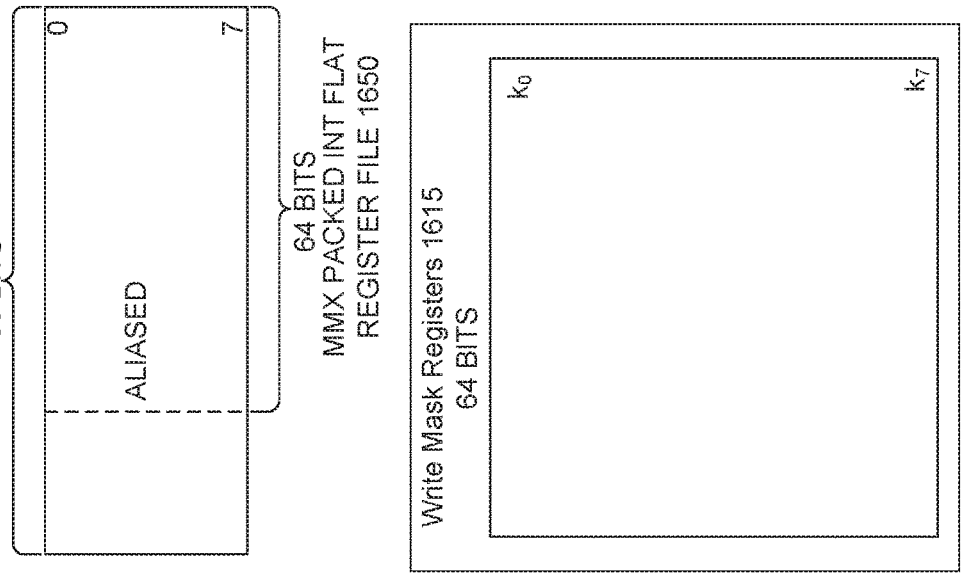
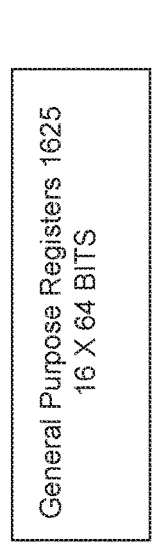
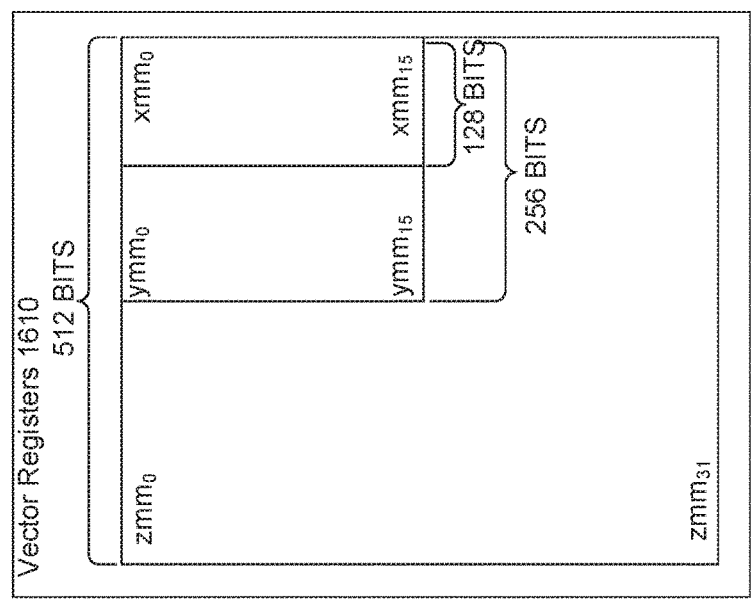

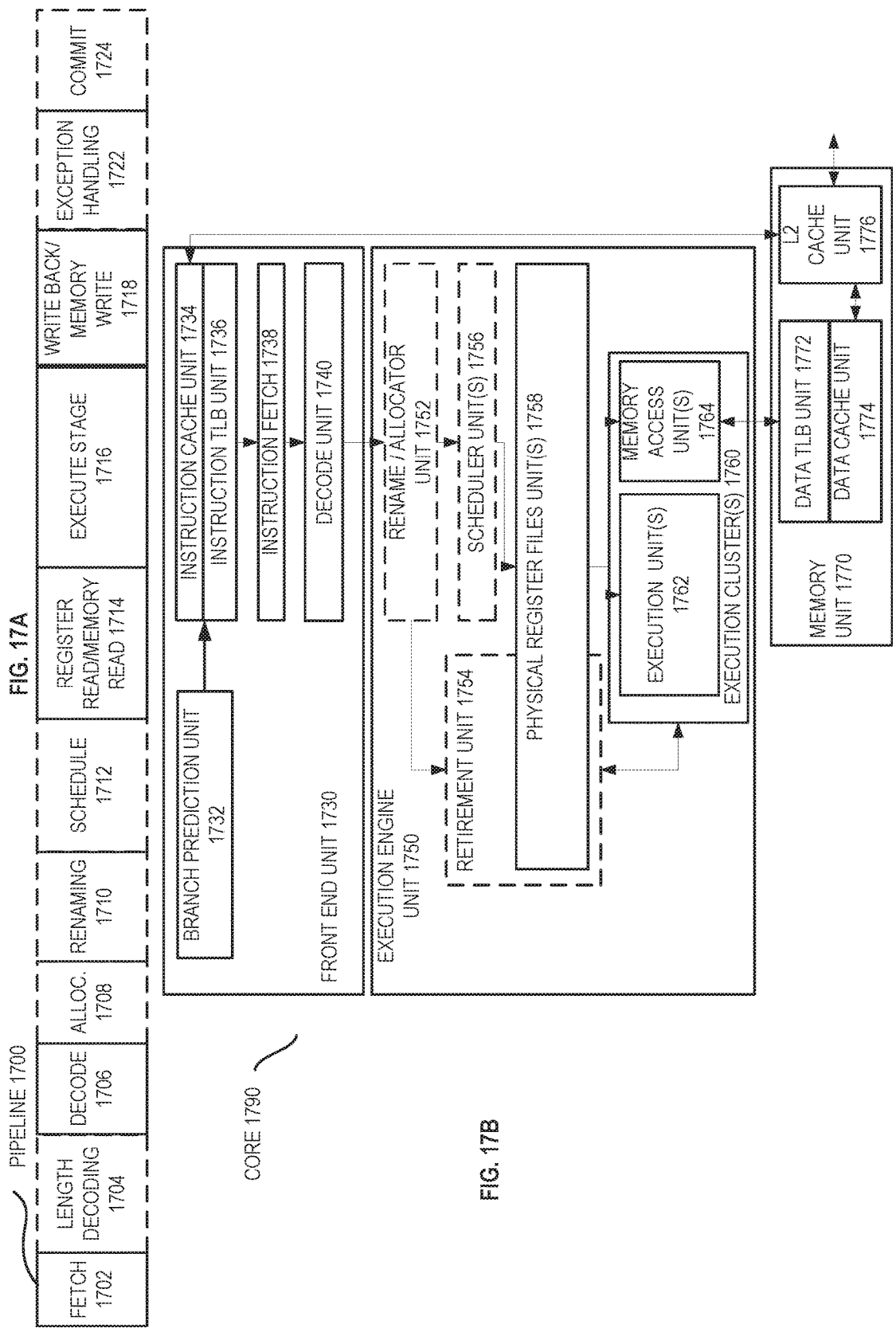

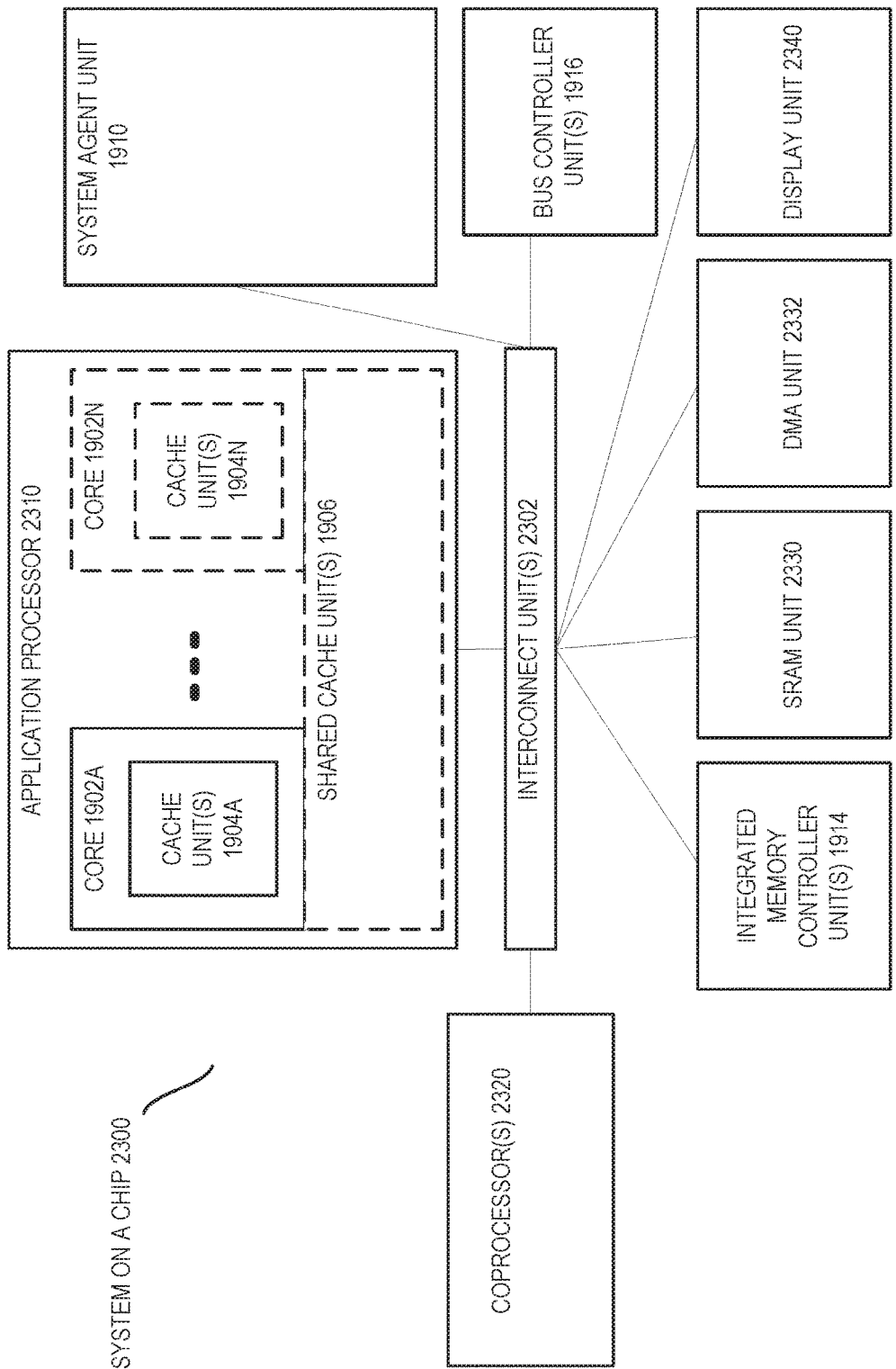

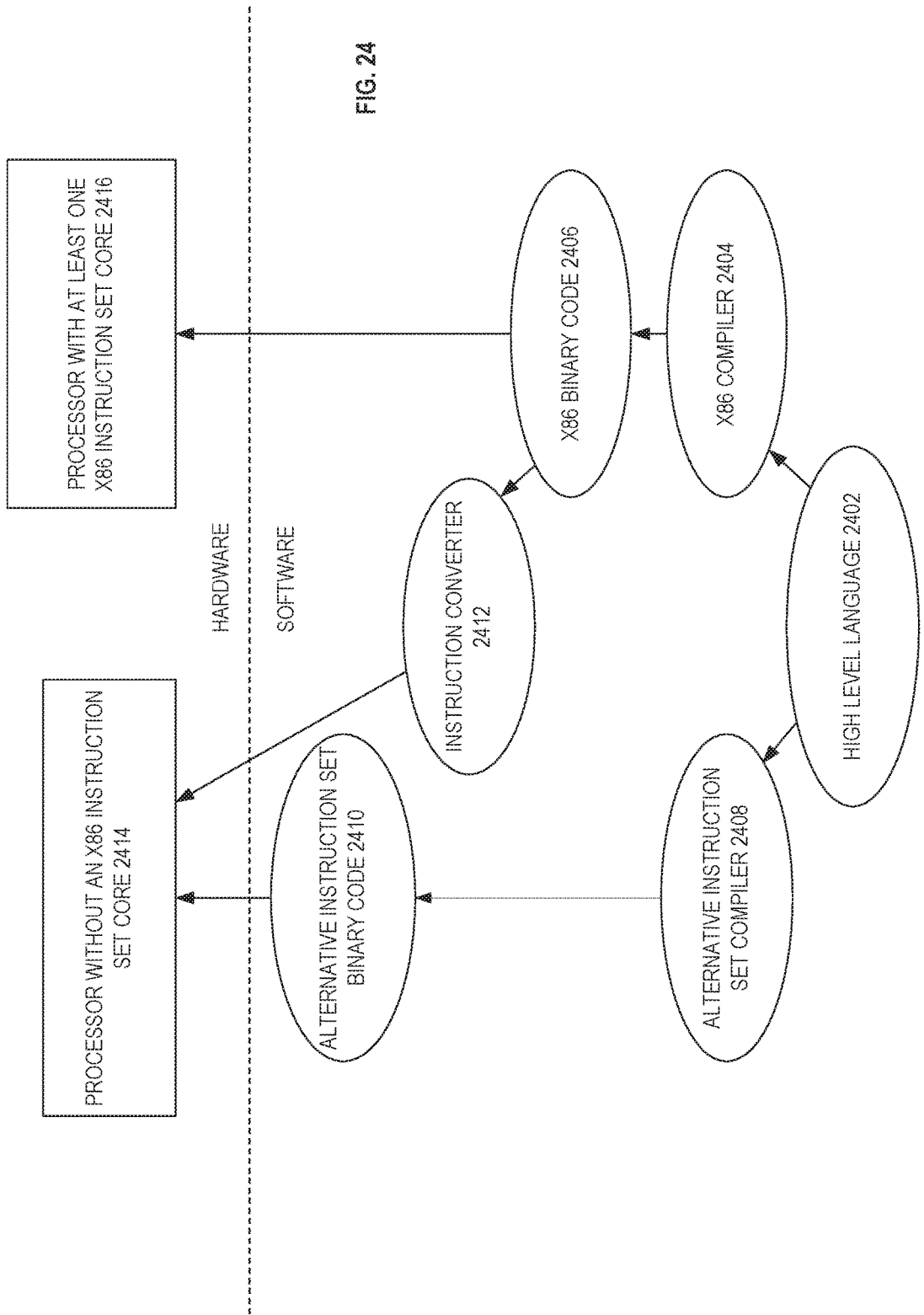

THREE SOURCE OPERAND FLOATING-POINT ADDITION INSTRUCTION WITH OPERAND NEGATION BITS AND INTERMEDIATE AND FINAL RESULT ROUNDING

CROSS-REFERENCE TO RELATED APPLICATION

This patent application claims priority under 35 U.S.C. Section 119(b) to European Patent Application No EP14382106.4, filed on Mar. 26, 2014, entitled "THREE SOURCE OPERAND FLOATING POINT ADDITION PROCESSORS, METHODS, SYSTEMS, AND INSTRUCTIONS."

BACKGROUND

Technical Field

Embodiments described herein generally relate to processors. In particular, embodiments described herein generally relate to processors to add floating point numbers responsive to instructions.

Background Information

Floating point numbers are commonly used in processors, computer systems, and other electronic devices. One advantage of floating point numbers is that they allow a wide range of numerical values to be represented in a relatively compact numerical format and/or number of bits. The floating point numbers may have their bits apportioned into several constituent fields known as the sign, the significand, and the exponent of the floating point number. The sign, significand, base, and exponent may be related as follows:

$$A = (-1)^{sign} \times significand \times base^{exponent}$$

The expression "(-1)sign" represents negative one raised to the power of the sign. This expression evaluates whether the floating point number is positive (+) or negative (-). For example, when the sign is integer zero the floating point number is positive, or alternatively when the sign is integer one the floating point number is negative. The significand includes a digit string of a length that largely determines the precision of the floating point number. The significand is also sometimes referred to as the significant digits, the coefficient, the fraction, or the mantissa. The radix point (e.g., the decimal point for decimal format or the binary point for binary format) is commonly implicitly assumed to reside at a fixed position (e.g., just to the right of the leftmost or most significant digit of the significand, which in some cases may be implicit). An example significand in binary may be "1.10010010000111111011011". The digits of the significand to the right of the radix point (e.g., "10010010000111111011011") may represent the fraction bits. The expression "base$^{exponent}$" represents the base raised to the power of the exponent. The base is commonly base 2 (for binary), base 10 (for decimal), or base 16 (for hexadecimal). The base is sometimes referred to as the radix. The exponent is also referred to as a characteristic or scale. Raising the base to the power of the exponent in effect shifts the radix point (e.g., from the implicit or assumed starting position) by the exponent number of digits. The radix point is shifted to the right if the exponent is positive, or to the left if the exponent is negative.

The Institute of Electrical and Electronics Engineers (IEEE) has standardized several different floating point formats in the standard IEEE 754. Representatively, a single precision floating point format has 32-bits and includes a 23-bit significand in bits [22:0], an 8-bit exponent in bits [30:23], and a 1-bit sign in bit [31]. A double precision floating point format has 64-bits and includes a 52-bit significand in bits [51:0], an 11-bit exponent in bits [62:52], and a 1-bit sign in bit [63]. Other floating point formats are also known in the arts, such as, for example, half precision floating point, extended double precision floating point, and quadruple precision floating point formats. Further details on floating point numbers and formats, if desired, are available in IEEE 754.

BRIEF DESCRIPTION OF THE DRAWINGS

The invention may best be understood by referring to the following description and accompanying drawings that are used to illustrate embodiments. In the drawings:

FIG. 2 is a block flow diagram of an embodiment of a method of performing an embodiment of a three source floating point addition instruction.

FIG. 10 is a block diagram of an embodiment of a suitable instruction format for a three source floating point addition instruction.

FIG. 15A is a block diagram illustrating an exemplary specific vector friendly instruction format, according to embodiments of the invention.

FIG. 15B is a block diagram illustrating fields of a specific vector friendly instruction format that make up a full opcode field, according to one embodiment of the invention.

FIG. 15C is a block diagram illustrating fields of a specific vector friendly instruction format that make up a register index field, according to one embodiment of the invention.

FIG. 15D is a block diagram illustrating fields of a specific vector friendly instruction format that make up an augmentation operation field, according to one embodiment of the invention.

FIG. 16 is a block diagram of an embodiment of a register architecture.

FIG. 17A is a block diagram illustrating an embodiment of an in-order pipeline and an embodiment of a register renaming out-of-order issue/execution pipeline.

FIG. 17B is a block diagram of an embodiment of processor core including a front end unit coupled to an execution engine unit and both coupled to a memory unit.

FIG. 23 is a block diagram of a fourth embodiment of a computer architecture.

FIG. 24 is a block diagram of use of a software instruction converter to convert binary instructions in a source instruction set to binary instructions in a target instruction set, according to embodiments of the invention.

DETAILED DESCRIPTION OF EMBODIMENTS

Disclosed herein are three source operand floating point addition instructions, processors to execute the instructions, methods performed by the processors when processing or executing the instructions, and systems incorporating one or more processors to process or execute the instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
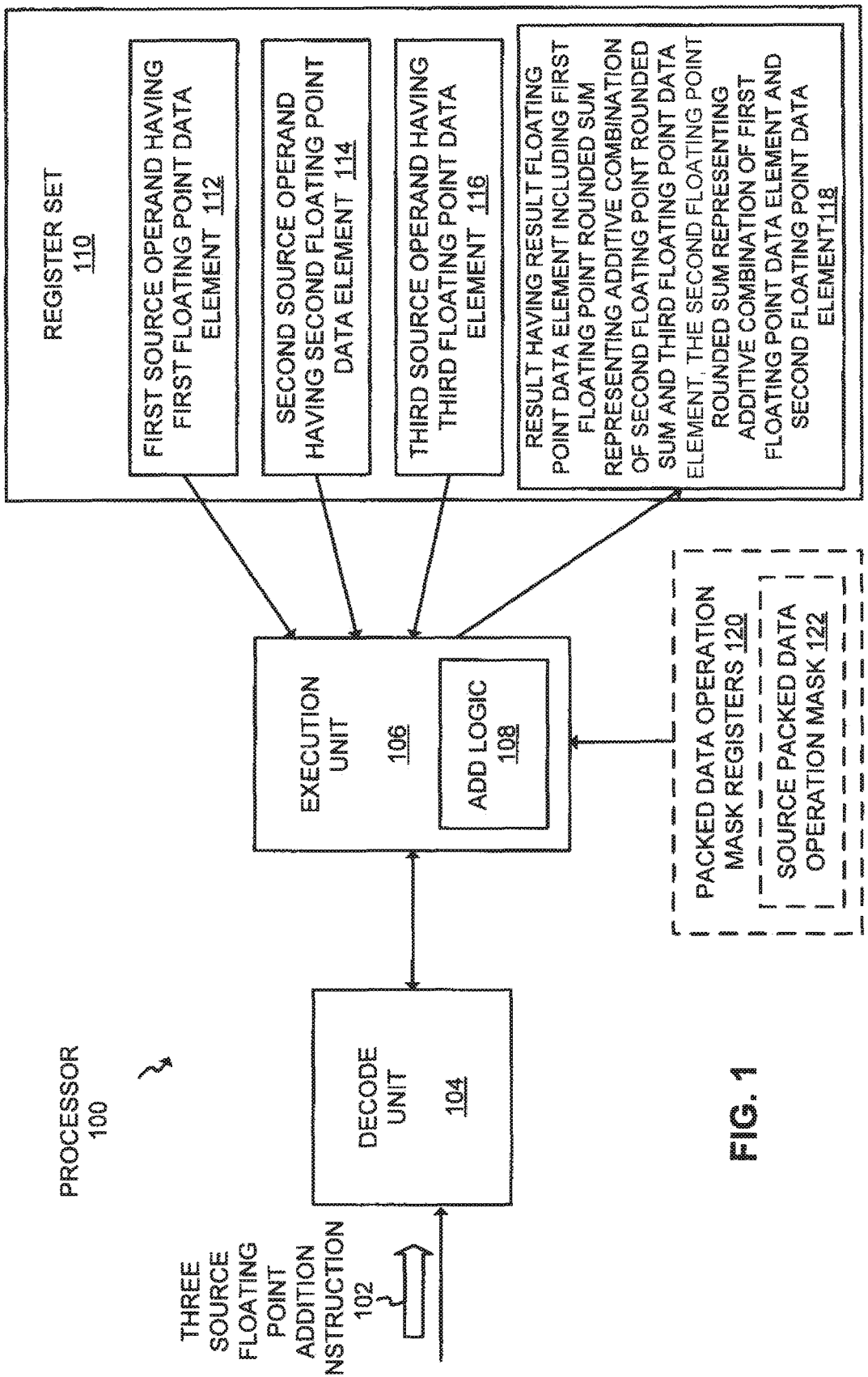
FIG. 1 is a block diagram of an embodiment of a processor that is operable to perform an embodiment of a three source floating point addition instruction.

FIG. 1 is a block diagram of an embodiment of a processor 100 that is operable to perform an embodiment of a three source floating point addition instruction 102. In some embodiments, the processor may be a general-purpose processor (e.g., of the type often used in desktop, laptop, or other computers). Alternatively, the processor may be a special-purpose processor. Examples of suitable special-purpose processors include, but are not limited to, graphics processors, network processors, communications processors, cryptographic processors, co-processors, embedded processors, digital signal processors (DSPs), and controllers (e.g., microcontrollers). The processor may be any of various complex instruction set computing (CISC) processors, various reduced instruction set computing (RISC) processors, various very long instruction word (VLIW) processors, various hybrids thereof, or other types of processors.

During operation, the processor 100 may receive the embodiment of the three source floating point addition instruction 102. For example, the three source floating point addition instruction may be received from an instruction fetch unit, an instruction queue, or the like. The three source floating point addition instruction may represent a macro-instruction, assembly language instruction, machine code instruction, or instruction or control signal of an instruction set of the processor. In some embodiments, the three source floating point addition instruction may explicitly specify (e.g., through one or more fields or a set of bits), or otherwise indicate (e.g., implicitly indicate, be mapped to that register through an emulation register mapping, etc.), a first source operand 112 that is to have at least a first floating point data element, may specify or otherwise indicate a second source operand 114 that is to have at least a second floating point data element, may specify or otherwise indicate a third source operand 116 that is to have at least a third floating point data element, and may specify or otherwise indicate a destination operand (e.g., a destination storage location) where a result 118 is to be stored.

Referring again to FIG. 1, the processor includes a decode unit or decoder 104. The decode unit may receive and decode the three source floating point addition instruction 102. The decode unit may output one or more microinstructions, micro-operations, micro-code entry points, decoded instructions or control signals, or other relatively lower-level instructions or control signals that reflect, represent, and/or are derived from the three source floating point addition instruction. The one or more lower-level instructions or control signals may implement the higher-level three source floating point addition instruction through one or more lower-level (e.g., circuit-level or hardware-level) operations. In some embodiments, the decode unit may include one or more input structures (e.g., port(s), interconnect(s), an interface, etc.) to receive the instruction, an instruction recognition and decode logic coupled with the input structures to receive, recognize, and decode the instruction into the one or more corresponding lower-level instructions or control signals, and one or more output structures (e.g., port(s), interconnect(s), an interface, etc.) coupled with the instruction recognition and decode logic to output the one or more corresponding lower level instructions or control signals. The decode unit may be implemented using various different mechanisms including, but not limited to, microcode read only memories (ROMs), look-up tables, hardware implementations, programmable logic arrays (PLAs), and other mechanisms known in the art.

In some embodiments, instead of the three source floating point addition instruction being provided directly to the decode unit, an instruction emulator, translator, morpher, interpreter, or other instruction conversion module may optionally be used. Various different types of instruction conversion modules are known in the arts and may be implemented in software, hardware, firmware, or a combination thereof. In some embodiments, the instruction conversion module may be located outside the instruction processing processor, such as, for example, on a separate die and/or in a memory (e.g., as a static, dynamic, or runtime instruction emulation module). By way of example, the instruction conversion module may receive the three source floating point addition instruction which may be of a first instruction set and may emulate, translate, morph, interpret, or otherwise convert the three source floating point addition instruction into one or more corresponding or derived intermediate instructions or control signals which may be of a second different instruction set. The one or more intermediate instructions or control signals of the second instruction set may be provided to a decode unit, which may decode the received one or more instructions or control signals of the second instruction set into one or more lower-level instructions or control signals executable by native hardware of the processor (e.g., one or more execution units).

The processor also includes a set of registers 110. Each of the registers may represent an on-die storage location that is operable to store floating point data. By way of example, the registers may be floating point registers operable to store floating point data elements, packed data registers operable to store packed or scalar floating point data elements, or the like. The registers may represent architectural or architecturally-visible registers (e.g., an architectural register file) that are visible to software and/or a programmer and/or are the registers indicated by instructions of an instruction set of the processor to identify operands. These architectural registers are contrasted to other non-architectural or non-architecturally visible registers in a given microarchitecture (e.g., temporary registers, reorder buffers, retirement registers, etc.). The registers may be implemented in different ways in different microarchitectures using well-known techniques and are not limited to any particular type of circuit. Examples of suitable types of registers include, but are not limited to, dedicated physical registers, dynamically allocated physical registers using register renaming, and combinations thereof.

In some embodiments, the first source operand 112 may optionally be stored in a first register of the set, the second source operand 114 may optionally be stored in a second register of the set, the third source operand 116 may optionally be stored in a third register of the set, and the destination operand may optionally be stored in a fourth register of the set. In some cases, the register used for the destination operand may be different than the registers used for the first, second, and third source operands. In other cases, the register used for one of the source operands may be reused for the destination operand (e.g., the result may be written over one of the source operands). Alternatively, memory locations, or other storage locations, may optionally be used for one or more of these operands.

Referring again to FIG. 1, the execution unit 106 is coupled with the decode unit 104 and the set of registers 110. In some embodiments, the execution unit may also be coupled with an optional packed data operation mask register 120 and/or an optional packed data operation mask 122, as will be described further below, although this is not required. The execution unit may receive the one or more decoded or otherwise converted instructions or control signals that represent and/or are derived from the three source floating point addition instruction. The execution unit may also receive the first source operand 112 having at least the first floating point data element, the second source operand 114 having at least the second floating point data element, and the third source operand 116 having at least the third floating point data element. The execution unit is operable in response to and/or as a result of the three source floating point addition instruction (e.g., in response to one or more instructions or control signals decoded directly or indirectly (e.g., through emulation) from the instruction) to store the result 118 in the destination operand indicated by the instruction. In some embodiments, the result may include at least a result floating point data element that corresponds to the first, second, and third floating point data elements. In some embodiments, the result floating point data element may include at least a first floating point rounded sum. The first floating point rounded sum is a floating point number and when appropriate has been rounded using floating point rounding. In some embodiments, the first floating point rounded sum may represent an additive combination of a second floating point rounded sum and the third floating point data element. In some embodiments, the second floating point rounded sum may represent an additive combination of the first floating point data element and the second floating point data element. In some embodiments, the result may be any of those shown and described for any of FIGS. 3-6, although the scope of the invention is not so limited.

For clarity, as used herein, the term "additive combination" of a first value and a second value is used to refer to a sum that allows neither, either, or both of the first and second values to be negated. For example, the additive combination of the second floating point rounded sum and the third floating point data element may include a sum of the third floating point data element added to the second floating point rounded sum, or a sum of the second floating point rounded sum added to a negation of the third floating point data element. Likewise, the additive combination of the first and second floating point data elements may include a sum of the first floating point data element added to the second floating point data element, a sum of the first floating point data element added to a negation of the second floating point data element, a sum of a negation of the first floating point data element added to a negation of the second floating point data element, or a sum of a negation of the first floating point data element added to the second floating point data element. As will be explained further below, some but not all embodiments may optionally allow any one, two, or all of the data elements to optionally be negated prior to the addition, although this is not required (e.g., another embodiment does not allow capability for such negation).

Advantageously, the three source floating point addition instruction may perform two additions within the confines of the execution of a single instruction (e.g., macroinstruction, instruction of the instruction set, etc.). Conventionally, two different instructions would be needed. The ability to perform both additions with one instruction may tend to provide certain performance and/or power benefits. For one thing, both of the additions may be performed through decoding a single instruction, instead of decoding two separate instructions. This may help to increase instruction decoding throughput by freeing up a decoding slot for another instruction. This may also help to reduce the amount of power consumption since one less instruction is decoded to accomplish the two additions. Performance improvements may also be achieved by avoiding a write of an intermediate sum of one of the two additions to an architectural register and a subsequent read of the intermediate sum from the architectural register in order to perform the second addition. Such writes and reads from the architectural register would generally incur additional time or latency (e.g., on the order of a few clock cycles). This may also help to avoid tying up the architectural register and help to reduce the number of register renaming operations. Eliminating the reads, writes, and register renaming operations may also help to reduce power consumption. For certain processors, reducing power consumption itself may lead to increased performance, since certain processors (e.g., especially those used for high performance computing) may tend to have performance that becomes limited by the available power consumption envelope. Accordingly, reducing power consumption may also lead to increased performance.

Floating point rounding may be used when the exact result of a floating-point operation (e.g., a floating point addition) would need more digits than there are digits in the significand. In some embodiments, the result may reflect two different floating point rounding operations, instead of a single floating point rounding operation. Specifically, a first initial floating point rounding operation may be performed for a sum involving the first and second floating point data elements to generate a first rounded sum, and then a second subsequent floating point rounding operation may be performed for the sum of the third floating point data element and the first rounded sum. As will be explained further below, these two floating point rounding operations may reflect a microarchitectural implementation of the instruction. For example, in some embodiments, a microarchitecture used to implement the instruction may use logic that is not capable of concurrent addition of three floating point values. As one example, as will be explained further below, two floating point adders may be used in series, and each to perform concurrent addition of only two floating point values. For example, in a first adder a sum of two floating point values may be performed, and then a first floating point rounding operation may be performed on the sum, and then in a second adder a sum of a third floating point value and rounded sum may be performed, and then a second rounding operation may be performed on the sum output of the second adder.

As another example, as will be explained further below, a single floating point adder may be used with recirculation, and during each cycle or pass through the adder a concurrent addition of only two floating point values may be performed. For example, in one pass a sum of two floating point values may be performed, and then a first floating point rounding operation may be performed on that sum, and then in a second pass a sum of a third floating point value and the rounded sum from the first pass may be performed, and then a second rounding operation may be performed on the output of the adder in the second pass. As will be explained further below, there are advantages to such microarchitectural implementations, such as, for example, avoiding a need to include special-purpose and/or generally large or complex logic to perform concurrent addition of three floating point values. The results involving the two floating point rounding operations may be slightly different than if a single rounding operation were performed, and reflect such microarchitectural implementations.

In some embodiments, the same type of rounding operation or rounding mode may be used for both occurrences of the rounding. Different types of rounding operations or rounding modes are suitable for various embodiments. Examples of suitable rounding modes include, but are not limited to, the following: (1) round to nearest with ties to even; (2) round down toward negative infinity; (3) round up toward positive infinity; and (4) round toward zero with truncate.

In some embodiments, the three source floating point addition instruction may have support for embedded rounding mode control within the instruction itself, although this is not required. Conventionally, rounding mode control is generally specified in a floating point control and status register (e.g., MXCSR). Some instructions are able to provide per-instruction rounding override via encoding fields within an immediate operand. In some embodiments, per-instruction rounding mode override control may be provided through an encoding of an instruction and outside of an immediate. As an example, in some embodiments, the rounding mode control may be embedded in a prefix (e.g., an EVEX prefix) as a static or per-instruction rounding mode override control. This may allow a programmer to statically apply a specific rounding mode that may override a rounding mode in a floating point control and status register (e.g., MXCSR). In some embodiments, suppression of reporting of all floating point exceptions may optionally be implied when such rounding mode control is provided through the instruction encoding. The suppression of the reporting of all floating point exceptions may occur irrespective or regardless of any specific mask bits to suppress or not suppress the reporting of the corresponding floating point exceptions in the floating point control and status register (e.g., MXCSR). The suppression of the reporting of these floating point exceptions may mean that bits or flags in the floating point control and status register (e.g., MXCSR) may not be updated when such floating point exceptions occur (e.g., they may not be reported).

Referring again to FIG. 1, the execution unit 106 and/or the processor 100 may include specific or particular logic (e.g., transistors, integrated circuitry, or other hardware potentially combined with firmware (e.g., instructions stored in non-volatile memory) and/or software) that is operable to perform the three source floating point addition instruction and/or store the result in response to and/or as a result of the three source floating point addition instruction (e.g., in response to one or more instructions or control signals decoded or otherwise derived from the three source floating point addition instruction). The execution unit may include floating point add logic 108. By way of example, the execution unit and/or the floating point add logic may include a floating point adder, a floating point fused multiplier-adder (FMA), a floating point arithmetic unit, a floating point arithmetic logic unit, or the like. In some embodiments, the execution unit may include one or more input structures (e.g., port(s), interconnect(s), an interface, etc.) to receive the source operands, floating point addition circuitry or logic coupled with the input structure(s) to receive and process the source operands and generate the result, and one or more output structures (e.g., port(s), interconnect(s), an interface, etc.) coupled with the floating point addition circuitry or logic to output the result. In some embodiments, the execution unit may include the circuitry or logic shown and described for any one or more of FIGS. 7-9, which are illustrative examples of suitable micro-architectural arrangements, although the scope of the invention is not so limited.

To avoid obscuring the description, a relatively simple processor 100 has been shown and described. In other embodiments, the processor may optionally include other well-known processor components. Possible examples of such components include, but are not limited to, an instruction fetch unit, instruction and data caches, second or higher level caches, out-of-order execution logic, an instruction scheduling unit, a register renaming unit, a retirement unit, a bus interface unit, instruction and data translation lookaside buffers, prefetch buffers, microinstruction queues, microinstruction sequencers, other components included in processors, and various combinations thereof. Numerous different combinations and configurations of such components are suitable. Embodiments are not limited to any known combination or configuration. Moreover, embodiments may be included in processors have multiple cores, logical processors, or execution engines at least one of which has a decode unit and an execution unit to perform an embodiment of a three source floating point addition instruction.

FIG. 2 is a block flow diagram of an embodiment of a method 225 of performing an embodiment of a three source floating point addition instruction. In various embodiments, the method may be performed by a processor, instruction processing apparatus, or other digital logic device. In some embodiments, the operations and/or method of FIG. 2 may be performed by and/or within the processor of FIG. 1. The components, features, and specific optional details described herein for the processor of FIG. 1 also optionally apply to the operations and/or method of FIG. 2. Alternatively, the operations and/or method of FIG. 2 may be performed by and/or within a similar or different processor or apparatus. Moreover, the processor of FIG. 1 may perform operations and/or methods the same as, similar to, or different than those of FIG. 2.

The method includes receiving the three source floating point addition instruction, at block 226. In various aspects, the instruction may be received at a processor, an instruction processing apparatus, or a portion thereof (e.g., an instruction fetch unit, a decode unit, a bus interface unit, etc.). In various aspects, the instruction may be received from an off-die source (e.g., from memory, interconnect, etc.), or from an on-die source (e.g., from an instruction cache, instruction queue, etc.). The three source floating point addition instruction may specify or otherwise indicate a first source operand having at least a first floating point data element, specify or otherwise indicate a second source operand having at least a second floating point data element, and may specify or otherwise indicate a third source operand having at least a third floating point data element.

A result is stored in a destination operand in response to and/or as a result of the three source floating point addition instruction, at block 227. The destination operand may be specified or otherwise indicated by the three source floating point addition instruction. Representatively, an execution unit, instruction processing apparatus, or processor may perform the instruction and store the result. The result may include at least a result floating point data element that is to correspond to the first, second, and third floating point data elements. The result floating point data element may include a first floating point rounded sum. In some embodiments, the first floating point rounded sum may represent an additive combination of a second floating point rounded sum and the third floating point data element. In some embodiments, the second floating point rounded sum may represent an additive combination of the first floating point data element and the second floating point data element. In some embodiments, the result may be any of those shown and described for any of FIGS. 3-6, although the scope of the invention is not so limited.

The illustrated method involves architectural operations (e.g., those visible from a software perspective). In other embodiments, the method may optionally include one or more microarchitectural operations. By way of example, the instruction may be fetched, decoded, source operands may be accessed, an execution unit may perform microarchitectural operations to implement the instruction, etc. In some embodiments, the microarchitectural operations to implement the instruction may optionally include any of those shown and described for any of FIG. 3-6 or 7-9. For example, in some embodiments, the second floating point rounded sum may optionally be provided from a first floating point adder to a second floating point adder. As another example, in some embodiments, the second floating point rounded sum may optionally be recirculated from an output of a floating point adder to an input of the floating point adder.

Figure 3:
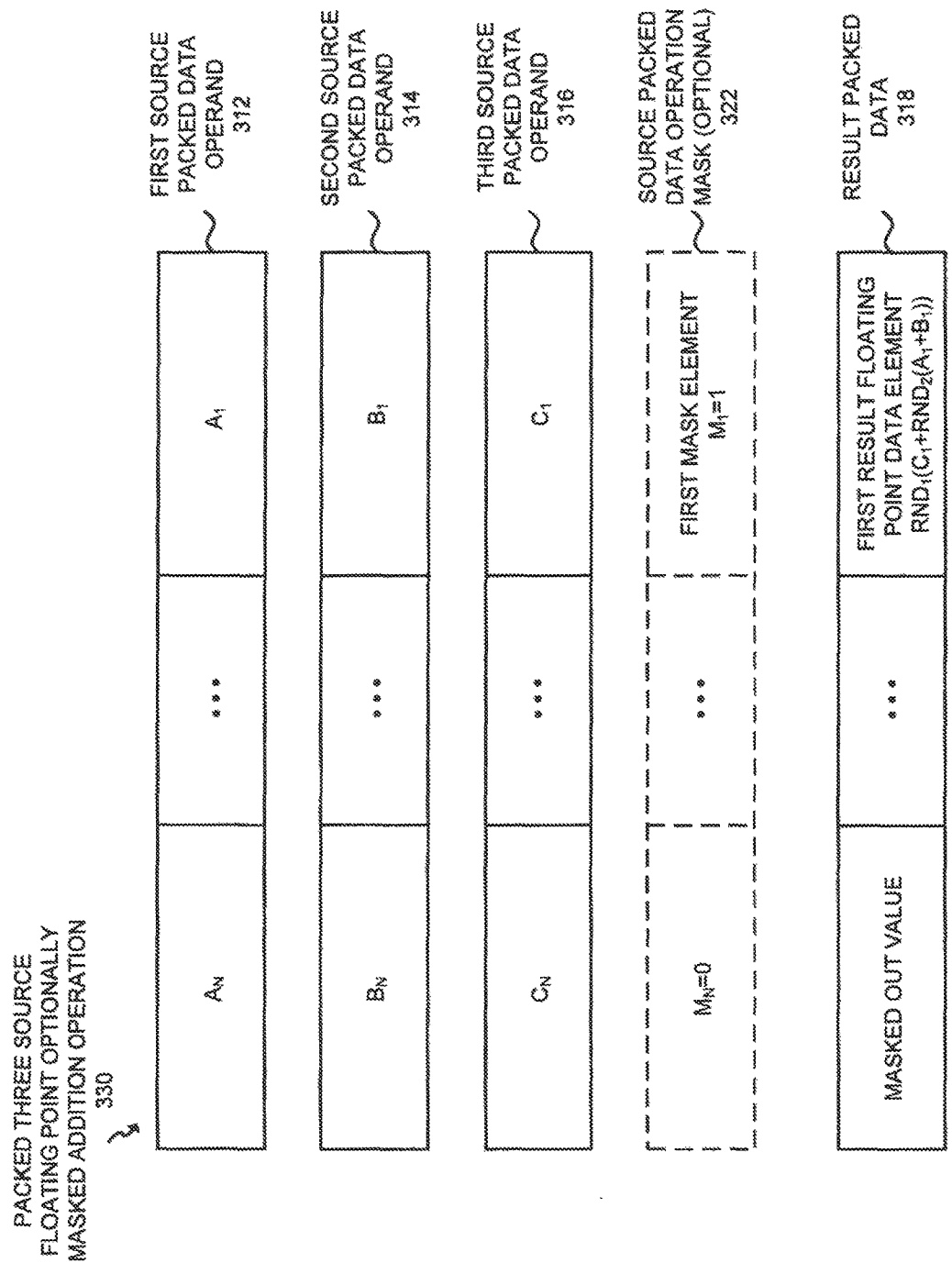
FIG. 3 is a block diagram of an embodiment of a packed three source floating point optionally masked addition operation.

FIG. 3 is a block diagram illustrating an embodiment of a packed three source floating point optionally masked addition operation 330 that may be performed in response to an embodiment of a packed three source floating point optionally masked addition instruction. The instruction may specify (e.g., explicitly specify) or otherwise indicate (e.g., implicitly indicate) a first source packed data operand 312, a second source packed data operand 314, and a third source packed data operand 316. The first source packed data operand may have a first plurality of packed floating point data elements $A_1$-$A_N$. The second source packed data operand may have a second plurality of packed floating point data elements $B_1$-$B_N$. The third source packed data operand may have a third plurality of packed floating point data elements $C_1$-$C_N$. Each data element in the first source packed data operand may correspond to a different data element in the second source packed data operand, and to a different data element in the third source packed data operand, in a corresponding relative position within the operands. For example, $A_1$, $B_1$, and $C_1$ may correspond to one another, $A_N$, $B_N$, and $C_N$ may correspond to one another, and so on.

Commonly, the number of floating point data elements in each source packed data operand may be equal to the size in bits of the source packed data operand divided by the size in bits of each floating point data element. In various embodiments, the widths of each of the source packed data operands may be 64-bits, 128-bits, 256-bits, 512-bits, or 1024-bits, although the scope of the invention is not so limited. In various embodiments, each floating point data element may be a 16-bit half precision floating point data element, a 32-bit single precision floating point data element, a 64-bit double precision floating point data element, an 80-bit double extended precision format, or a 128-bit quadruple precision floating point format. In some embodiments, 32-bit single precision or 64-bit double precision formats may be supported due to their current widespread use. Other packed data operand sizes and data elements widths are also suitable. In various embodiments, there may be at least two, at least four, at least eight, or more than eight floating point data elements in each source packed data operand.

Referring again to FIG. 3, as shown, in some embodiments, the instruction may also optionally specify or otherwise indicate a source packed data operation mask 322, although this is not required. The packed data operation mask may also be referred to herein simply as an operation mask, predicate mask, or mask. The source packed data operation mask may have a plurality of mask elements $M_1$-$M_N$. Each mask element may correspond to a source data element and/or a result data element in a corresponding relative position within the operands. For example, $M_1$ may correspond to $A_1$, $B_1$, and $C_1$.

The source packed data operation mask may represent a mask operand, predicate operand, or conditional control operand that may be used to predicate, conditionally control, or mask whether or not corresponding packed data operations are to be performed and/or corresponding results are to be stored. In some embodiments, the masking or predication may be at per-data element granularity such that operations on different sets of three corresponding data elements may be predicated or conditionally controlled separately and/or independently of others. The mask may include multiple mask elements, predicate elements, or conditional control elements. In one aspect, the mask elements may be included in a one-to-one correspondence with corresponding sets of three source data elements and/or corresponding result data elements. As shown, in some embodiments, each mask element may be a single mask bit. In such cases, the mask may have a bit for each data element in the first source packed data operand and/or each result data element in a result packed data 318. A value of each mask bit may control whether or not a corresponding packed data operation is to be performed and/or a corresponding result data element is to be stored. Each mask bit may have a first value to allow the operation to be performed on the corresponding set of three source data elements and allow the corresponding result data element to be stored in the result packed data, or may have a second different value to not allow the operation to be performed on the corresponding set of three source data elements and/or not allow the corresponding result data element to be stored in the result packed data. According to one possible convention, as shown in the illustration, a mask bit cleared to binary zero (i.e., 0) may represent a masked out operation, where a masked out value instead of a result of the operation is stored in the corresponding result data element. In contrast, a mask bit set to binary one (i.e., 1) may represent an unmasked operation, where a result of the operation may be stored in the corresponding result data element. In other embodiments, the opposition convention may be used, or two or more bits may optionally be used for each mask element (e.g., each mask element may have a same number of bits as each corresponding source data element and one or more most or least significant bits may be used for predication).

The embodiment of the operation 330 may be performed in response to and/or as a result of the embodiment of the instruction. In embodiments where a packed data operation mask 322 is optionally used, the operation may be performed subject to the masking, predication, or conditional control of the optional source packed data operation mask. A result packed data 318 may be generated (e.g., by an execution unit) and stored in a destination storage location in response to the instruction. The destination storage location may be specified or otherwise indicated by the instruction. In various embodiments, the destination storage location may be a packed data register, a memory location, or other storage location. The result packed data may include a plurality of data elements that each correspond to a different set of three source data elements and to a different corresponding mask element.

In embodiments where the optional packed data operation mask is used, the result data elements corresponding to unmasked mask elements may have values that depend on the operation performed on the corresponding set of three source floating point data elements. In the illustrated example, the rightmost result data element corresponds to an unmasked operation and stores a value that depends on the corresponding packed data operation performed on the corresponding set of three source floating point data elements from the first, second, and third source packed data operands. Specifically, in some embodiments, the rightmost result floating point data element may store a first floating point rounded sum (e.g., $RND_1(C_1+RND_2(A_1+B_1))$. The first floating point rounded sum may represent an additive combination of a second floating point rounded sum (e.g., $RND_2(A_1+B_1)$) and the third floating point data element (e.g., $C_1$). The second floating point rounded sum (e.g., $RND_2(A_1+B_1)$) may represent an additive combination of the first floating point data element (e.g., $A_1$) and the second floating point data element (e.g., $B_1$). The additive combinations allow for the source data elements (e.g., any one or more of $A_1$, $B_1$, and/or $C_1$) to optionally or potentially be negated. In this example, $RND_1$ and $RND_2$ are used to designate two separate sequentially employed floating point rounding operations (e.g., $RND_2$ is performed before $RND_1$.

In contrast, in embodiments where the optional packed data operation mask 322 is used, the result data elements corresponding to masked-out mask elements may have values that do not depend on the operation performed on the corresponding pair of source data elements. Rather, these result data elements may have masked out values (e.g., fixed or predetermined values). For example, either the corresponding operation need not be performed, or if the corresponding operation is performed then the corresponding result need not be stored in the result packed data. Rather, the masked out value (e.g., a fixed or predetermined value) may be stored in the corresponding result data element.

In the illustrated example, the Nth mask element $M_N$ has a masked out value (e.g., in this case binary zero). As a result, the corresponding leftmost result data element has a masked out value. The particular masked out value may depend on the type of masking used for the particular implementation. In some embodiments, zeroing masking may be used. In zeroing masking, the masked-out result data elements may be zeroed-out (e.g., be forced to have a value of zero). In other embodiments, merging masking may be used. In merging masking, the masked-out result data elements may have a value of one of the corresponding source data elements (e.g., the corresponding source data element may be passed through to the masked-out result data element). For example, the leftmost result data element may have the value of one of $A_N$, $B_N$, or $C_N$. In other embodiments, other result data elements may be masked or unmasked.

Figure 4:
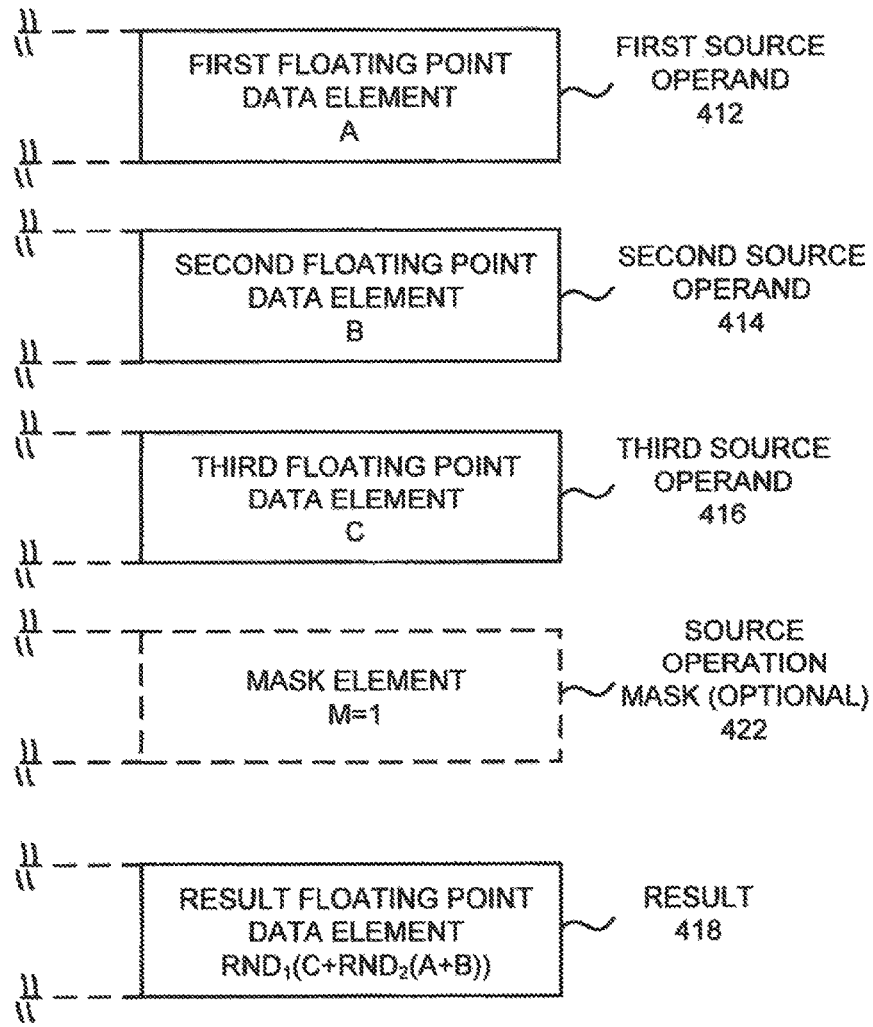
FIG. 4 is a block diagram of an embodiment of a scalar three source floating point optionally masked addition operation.

FIG. 4 is a block diagram illustrating an embodiment of a scalar three source floating point optionally masked addition operation 432 that may be performed in response to an embodiment of a scalar three source floating point optionally masked addition instruction. The scalar operation of FIG. 4 has certain similarities to the packed operation of FIG. 3. To avoid obscuring the description, the different and/or additional characteristics for the scalar operation of FIG. 4 will primarily be described, without repeating all the optionally similar or common characteristics and details relative to the packed operation of FIG. 3. However, it is to be appreciated that the previously described characteristics and details of the packed operation of FIG. 3, except for aspects related to there being a plurality of data elements in each operand, may also optionally apply to the scalar operation of FIG. 4, unless stated otherwise or otherwise clearly apparent.

The instruction may specify (e.g., explicitly specify) or otherwise indicate (e.g., implicitly indicate) a first source operand 412, a second source operand 414, and a third source operand 416. The first source operand may have a first floating point data element A. The second source operand may have a second floating point data element B. The third source operand may have a third floating point data element C. The data elements A, B, and C may correspond to one another. The previously mentioned types of floating point data elements mentioned above for FIG. 3 are suitable.

In some embodiments, the data elements A, B, and C may be stored in scalar formats in respective packed data registers. The packed data registers may have a greater width in bits than the floating point data elements A, B, and C. For example, in various embodiments, the widths of each of the packed data registers may be 64-bits, 128-bits, 256-bits, 512-bits, or 1024-bits, although the scope of the invention is not so limited. In one particular example, 128-bit packed data registers may be used, although this is not required. The packed data registers may be capable of storing packed data in addition to the scalar floating point data elements A, B, and C.

Referring again to FIG. 4, as shown, in some embodiments, the instruction may also optionally specify or otherwise indicate a source operation mask 422, although this is not required. The source operation mask may have a mask element M. The mask element M may correspond to the source data elements A, B, and C. The mask element M may also correspond to a result data element in a same relative position in a result 418. The source operation mask may have similar attributes and variations as previously described for the source packed data operation mask of FIG. 3, with the primary exception that there is a single mask element instead of a plurality. In this example embodiment, the mask element is unmasked (e.g., M=1). In some embodiments, the source operation mask may be used even though there is only a single set of corresponding scalar elements.

The embodiment of the operation 432 may be performed in response to and/or as a result of the embodiment of the instruction. In embodiments where the operation mask 422 is optionally used, the operation may be performed subject to the masking, predication, or conditional control of the optional source operation mask. A result 418 may be generated (e.g., by an execution unit) and stored in a destination storage location in response to the instruction. The destination storage location may be specified or otherwise indicated by the instruction. In various embodiments, the destination storage location may be a register, a memory location, or other storage location. The result may include a result floating point data element that corresponds to the source floating point data elements A, B, and C, and the mask element M.

In the illustrated example, since the mask element is unmasked (e.g., M=1), the result data element stores a value that depends on the operation performed on the corresponding set of source floating point data elements A, B, and C. Specifically, in some embodiments, the result floating point data element may store a first floating point rounded sum (e.g., $RND_1(C+RND_2(A+B))$. The first floating point rounded sum may represent an additive combination of a second floating point rounded sum (e.g., $RND_2(A+B)$) and the third floating point data element (e.g., C). The second floating point rounded sum (e.g., $RND_2(A+B)$) may represent an additive combination of the first floating point data element (e.g., A) and the second floating point data element (e.g., B). The additive combinations allow for any one or more of A, B, and C to optionally or potentially be negated. $RND_1$ and $RND_2$ are used to designate two separate sequentially employed floating point rounding operations.

In an alternate example, if the mask element were masked (e.g., if M=0), the result data element may instead store a masked out value (e.g., a fixed or predetermined value). The previously described masked out values mentioned for FIG. 3 are suitable (e.g., 0 in the case of zeroing masking or either A, B, or C in the case of merging masking).

Figure 5:
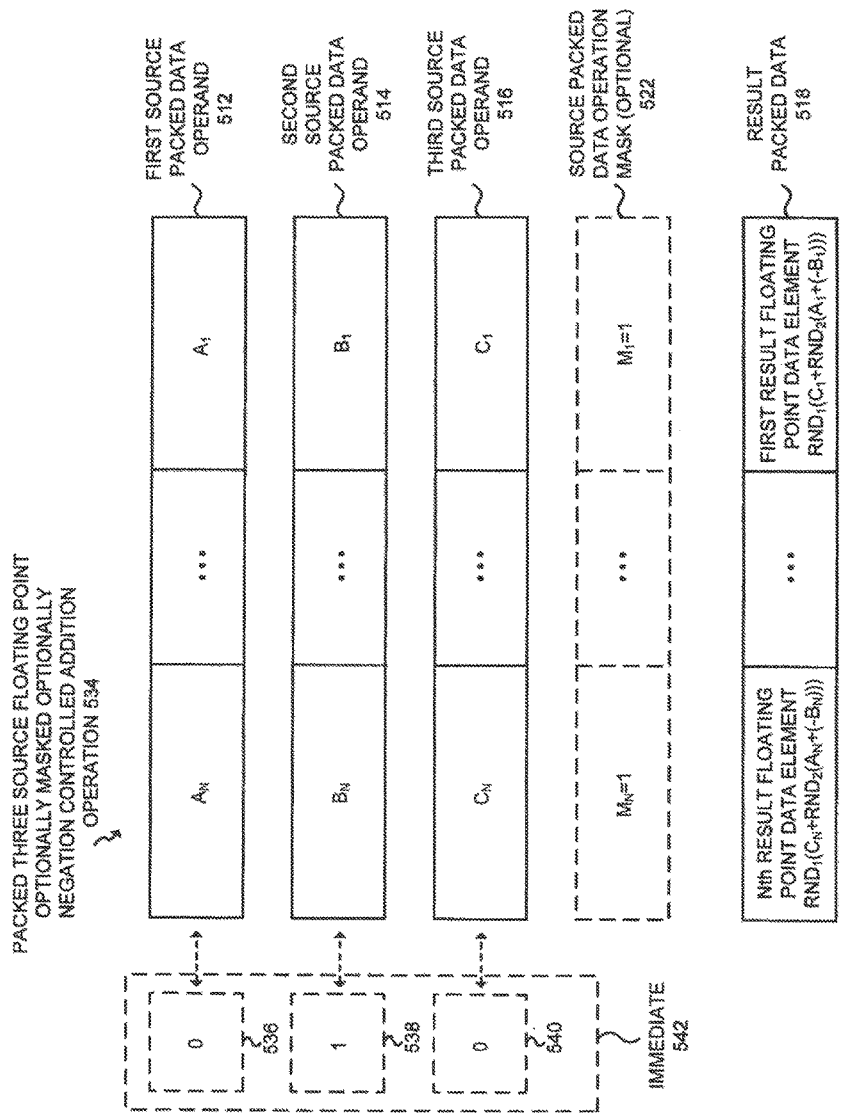
FIG. 5 is a block diagram of an embodiment of a packed three source floating point optionally masked optionally negation controlled addition operation.

FIG. 5 is a block diagram illustrating an embodiment of a packed three source floating point optionally masked optionally negation controlled addition operation 534 that may be performed in response to an embodiment of a packed three source floating point optionally masked optionally negation controlled addition instruction. The optionally negation controlled operation of FIG. 5 has certain similarities to the operation of FIG. 3. To avoid obscuring the description, the different and/or additional characteristics for the optionally negation controlled operation of FIG. 5 will primarily be described, without repeating all the optionally similar or common characteristics and details relative to the operation of FIG. 3. However, it is to be appreciated that the previously described characteristics and details of the operation of FIG. 3 may also optionally apply to the optionally negation controlled operation of FIG. 5, unless stated otherwise or otherwise clearly apparent.

The instruction may specify or otherwise indicate a first source packed data operand 512 having floating point data elements $A_1$-$A_N$, a second source packed data operand 514 having floating point data elements $B_1$-$B_N$, and a third source packed data operand 516 having floating point data elements $C_1$-$C_N$. The source packed data operands and data elements may have features and variations as previously described (e.g., for FIG. 3).

In some embodiments, the instruction may also optionally specify or otherwise indicate a source packed data operation mask 522, although this is not required. The source packed data operation mask may have mask elements $M_1$-$M_N$. The source packed data operation mask and the mask elements may have features and variations as previously described (e.g., for FIG. 3). In the illustrated example, mask element $M_1$ and $M_N$ are both unmasked (e.g., $M_1$=1 and $M_N$=1).

In some embodiments, the instruction may optionally have one or more bits of negation control, although this is not required. The one or more bits of negation control may allow software and/or a programmer to control negation of any one or more, or all, of the source operands. In some embodiments, the instruction may have a first set of one or more bits 536 that correspond to the first source operand 512 to specify whether all of the packed floating point data elements (e.g., $A_1$-$A_N$) of the first source operand are to be negated. In some embodiments, the instruction may also or alternatively have a second set of one or more bits 538 that correspond to the second source operand 514 to specify whether all of the packed floating point data elements (e.g., $B_1$-$B_N$) of the second source operand are to be negated. In some embodiments, the instruction may also or alternatively have a third set of one or more bits 540 that correspond to the third source operand 522 to specify whether all of the packed floating point data elements (e.g., $C_1$-$C_N$) of the third source operand are to be negated.

In some embodiments, a single bit may correspond to each respective source packed data operand and may be used to provide negation control for that source packed data operand. According to one possible convention, each single bit of negation control may be set to binary one (i.e., 1) to specify that all data elements of the corresponding source packed data are to be negated, or instead may be cleared to binary zero (i.e., 0) to specify that all data elements of the corresponding source packed data operand are not to be negated. For example, a first bit 536 may be set to specify that all data elements of the first source operand (e.g., $A_1$-$A_N$) are to be negated, or cleared to indicate that they are not to be negated. Similarly, a second bit 538 may be set to specify that all data elements of the second source operand (e.g., $B_1$-$B_N$) are to be negated, or cleared to indicate that they are not to be negated. Likewise, a third bit 540 may be set to specify that all data elements of the third source operand (e.g., $C_1$-$C_N$) are to be negated, or cleared to indicate that they are not to be negated.

In some embodiments there may be a single set of one or more bits of negation control which may correspond to and provide negation control for any of the first, second, and third source packed data. In other embodiments, there may be two sets of one or more bits each of negation control which may correspond to and provide negation control for any two of the first, second, and third source packed data.

Alternatively, there may be three sets of one or more bits each of negation control which may correspond to and provide negation control for all three of the first, second, and third source packed data.

In some embodiments, the bit(s) of negation control may optionally be provided by an immediate 542 of the instruction. For example, in one particular example embodiment, an 8-bit immediate may optionally be used, and single bit 536 which corresponds to the first source packed data may be provided by bit imm8[0], single bit 538 which corresponds to the second source packed data may be provided by bit imm8[1], and single bit 540 which corresponds to the third source packed data may be provided by bit imm8[2]. In other embodiments, other sized immediates may optionally be used, such as, for example, 2-bit immediates, 4-bit immediates, G-bit immediates, etc. In other embodiments, other bits of such immediates may optionally be used and/or may correspond in different ways with the source packed data. As another option, instead of using an immediate, the negation control bit(s) may be otherwise provided by the instruction (e.g., as part of an opcode, as another field of the instruction, etc.).

Referring again to FIG. 5, in the illustrated example, a single bit of negation control is used corresponding to each of the source packed data. Moreover, the bit is set to specify negation or cleared to specify no negation. In the illustrated example, the bit corresponding to the first source packed data is cleared and the bit corresponding to the third source packed data is cleared. Accordingly, the data elements of the first (e.g., $A_1$-$A_N$) and third source packed data (e.g., $C_1$-$C_N$) will not be negated. In contrast, the bit corresponding to the second source packed data is set, and so the data elements of the second source packed data (e.g., $B_1$-$B_N$) will be negated.

The embodiment of the operation 534 may be performed in response to and/or as a result of the embodiment of the instruction. A result packed data 518 may be generated (e.g., by an execution unit) and stored in a destination storage location in response to the instruction. The result packed data may include a plurality of result data elements. In the illustrated example embodiment, the rightmost result floating point data element may store a first floating point rounded sum (e.g., $RND_1(C_1+RND_2(A_1+(-B_1)))$, and the leftmost result floating point data element may store an Nth floating point rounded sum (e.g., $RND_1(C_N+RND_2(A_N+(-B_N)))$). Notice that the data elements $B_1$ through $B_N$ are negated based on the rounding control provided by the second bit 538. The first and Nth floating point rounded sums may each represent an additive combination of another respective floating point rounded sum (e.g., $RND_2(A_1+(-B_1))$ or $RND_2(A_N+(-B_N))$) and the corresponding floating point data element from the third source packed data (e.g., $C_1$ or $C_N$). The additive combinations allow for the source data elements, in this case $B_1$-$B_N$, to optionally or potentially be negated.

Advantageously, the ability for the instruction to specify negation control may optionally be used to increase the flexibility of the instruction (e.g., by allowing one or more sources to be subtracted). Alternatively, negation may optionally be performed outside of the confines of the execution of the packed three source floating point add instruction (e.g., by one or more other instructions).

Table 1 provides a description of a particular example embodiment of a packed three source double precision floating point masked and negation controlled addition instruction, which is named VADD3PD. In some embodiments, the instruction may have a format VADD3PD zmm1 {k1}{z}, zmm2, zmm3/m512, imm8{er}. In some embodiments, the instruction may be encoded in EVEX as EVEX.U1.NDS.512. F3.0F3A.W1 68/r/is4.

TABLE 1

VADD3PD

| INSTRUCTION: | DESCRIPTION: |
| --- | --- |
| VADD3PD - FUSED ADD- ADD OF PACKED DOUBLE PRECISION FLOATING- POINT VALUES | ADD PACKED DOUBLE-PRECISION FLOATING POINT VALUES FROM EXPLICIT SECOND OPERAND (ZMM2) WITH PACKED DOUBLE-PRECISION FLOATING POINT VALUES FROM EXPLICIT THIRD OPERAND (ZMM3 OR MEMORY512), RESULT WITH INTERMIEDIATE ROUNDING IS ADDED WITH PACKED DOUBLE-PRECISION FLOATING-POINT VALUES FROM EXPLICIT FIRST OPERAND (ZMM1), AND RESULT IS STORED IN IMPLICIT DESTINATION (ZMM1) WHICH IS SAME AS FIRST OPERAND BASED ON EXPLICIT WRITEMASK K1. IMMEDIATE BITS [2:0] ARE USED AS NEGATION CONTROL TO CONTROL THE SIGN OF THE ADDITIONS. |

Listed below is pseudocode for the VADD3PD instruction. DEST is a first source operand and a destination operand. SRC2 is a second source operand. SRC3 is a third source operand. VL is a vector length in bits in this case 512-bits. KL is a mask length in bits in this case 8-bits. The EVEX.b bit is used for embedded rounding control and suppression of exceptions. The k1 is a source operation mask. IMM8 is an 8-bit immediate. The "i" and "j" are counters. In other embodiments, registers may be replaced by memory or other storage locations.

```
VADD3PD DEST, SRC2, SRC3 (KL, VL) = (8, 512)
IF (VL == 512) AND (EVEX.b == 1) AND SRC3 *is a register*
    THEN SET_RM(EVEX.RC);
    ELSE SET_RM(MXCSR.RM);
FI;
FOR j ← 0 TO KL-1
    i ← j * 64
    IF k1[j] OR *no writemask*
        THEN DEST[i+63:i] ←
            TMP_SRC2[63:0] =
            (IMM8[0])? -SRC2[i+63:i] : SRC2[i+63:i]
            TMP_SRC3[63:0] =
            (IMM8[1])? -SRC3[i+63:i] : SRC3[i+63:i]
            TMP_DEST[63:0] =
            (IMM8[2])? -DEST[i+63:i] : DEST[i+63:i]
            RoundFPControl(
                RoundFPControl(TMP_SRC2[63:0]+
                TMP_SRC3[63:0])+TMP_DEST[63:0])
        ELSE
            IF *merging-masking*; merging-masking
                THEN *DEST[i+63:i] remains unchanged*
                ELSE ; zeroing-masking
                    DEST[i+63:i] ← 0
            FI
    FI;
ENDFOR
DEST[MAX_VL-1:VL] ← 0
```

Table 2 provides a description of a particular example embodiment of a packed three source single precision floating point masked and negation controlled addition instruction, which is named VADD3PS.

TABLE 2

VADD3PS

| INSTRUCTION: | DESCRIPTION: |
|---|---|
| VADD3PS - FUSED ADD-ADD OF PACKED SINGLE PRECISION FLOATING-POINT VALUES | ADD PACKED SINGLE-PRECISION FLOATING POINT VALUES FROM EXPLICIT SECOND OPERAND (ZMM2) WITH PACKED SINGLE-PRECISION FLOATING POINT VALUES FROM EXPLICIT THIRD OPERAND (ZMM3 OR MEMORY512), RESULT WITH INTERMIEDIATE ROUNDING IS ADDED WITH PACKED SINGLE-PRECISION FLOATING-POINT VALUES FROM EXPLICIT FIRST OPERAND (ZMM1), AND RESULT IS STORED IN IMPLICIT DESTINATION (ZMM1) WHICH IS SAME AS FIRST OPERAND BASED ON EXPLICIT WRITEMASK K1. IMMEDIATE BITS [2:0] ARE USED AS NEGATION CONTROL TO CONTROL THE SIGN OF THE ADDITIONS. |

The pseudocode for the VADD3PS instruction is analogous to the pseudocode for the VADD3PD instruction listed above, except that 32-bit instead of 64-bit data elements are used, and operation masks twice as wide are used. In other embodiments, registers may be replaced by memory or other storage locations These are just illustrative examples of suitable embodiments of instructions. Other embodiments may use either narrower or wider source packed data operands and/or may used different sizes of floating point data elements. Other embodiments may not use masking/predication. Other embodiments may not use negation control. Other embodiments may specify or indicate the source and/or destination operands differently.

Figure 6:
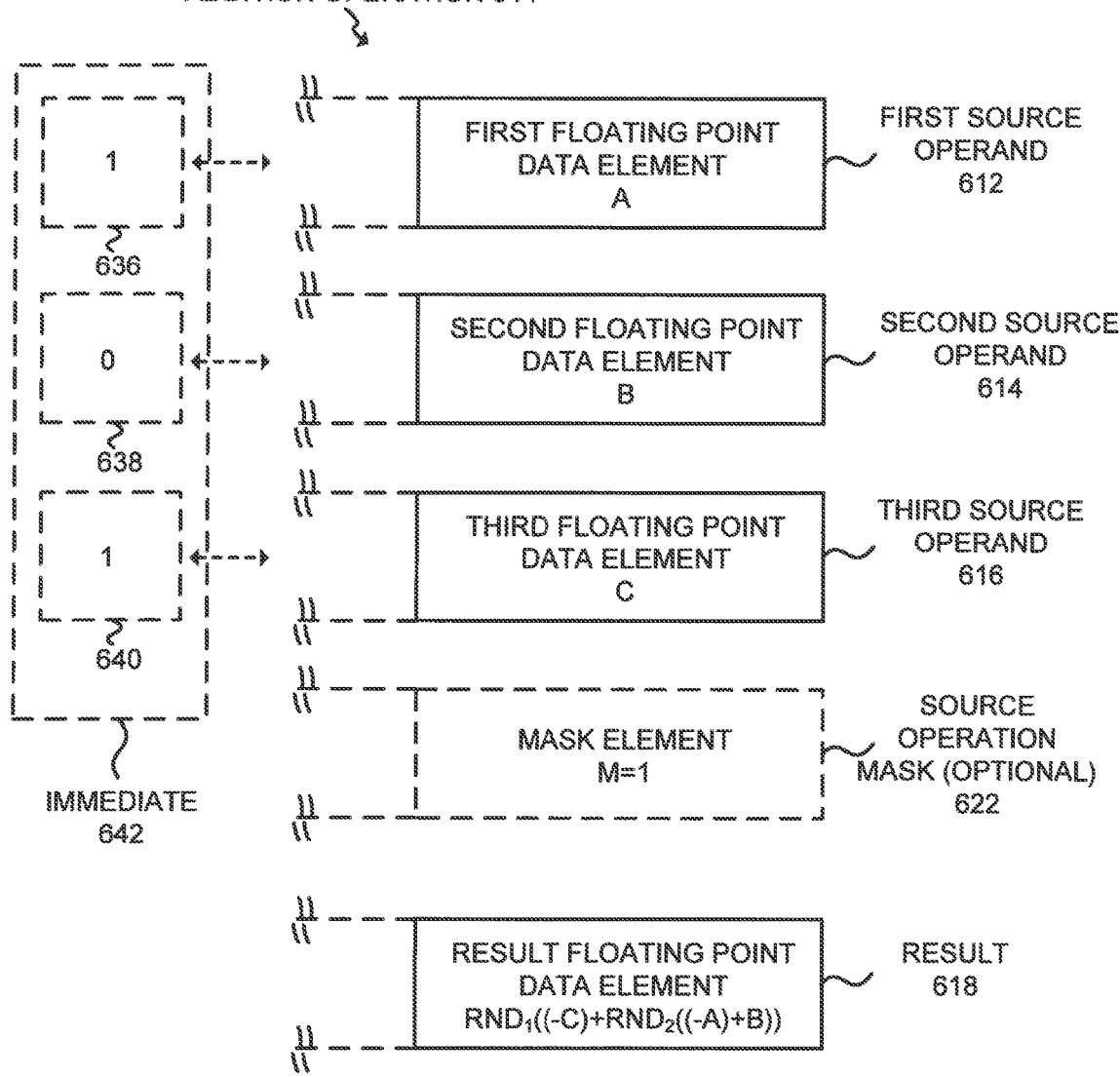
FIG. 6 is a block diagram of an embodiment of a scalar three source floating point optionally masked optionally negation controlled addition operation.

FIG. 6 is a block diagram illustrating an embodiment of a scalar three source floating point optionally masked optionally negation controlled addition operation 644 that may be performed in response to an embodiment of a scalar three source floating point optionally masked optionally negation controlled addition instruction. The scalar optionally negation controlled operation of FIG. 6 has certain similarities to the scalar operation of FIG. 4 but incorporates optional negation control similar to the packed operation of FIG. 5. To avoid obscuring the description, a brief description of FIG. 6 will be provided, without repeating all the optionally similar or common characteristics and details relative to the operation of FIG. 4-5. However, it is to be appreciated that the previously described characteristics and details of the scalar operation of FIG. 4 and the optional negation control aspects of the operation of FIG. 5 may also optionally apply to the operation of FIG. 6, unless stated otherwise or otherwise clearly apparent.

As with the scalar operation of FIG. 4, the instruction may specify or otherwise indicate a first source operand 612 having data element A, a second source operand 614 having data element B, and a third source operand 616 having data element C. The source operands and data elements may have features and variations as previously described (e.g., for FIG. 4).

In some embodiments, the instruction may also optionally specify or otherwise indicate a source operation mask 622, although this is not required. The source operation mask and the mask element may have features and variations as previously described (e.g., for FIG. 4). In the illustrated example, mask element M is unmasked (e.g., M=1).

In some embodiments, the instruction may optionally have one or more bits of negation control, although this is not required. For example, in the illustrated embodiment, the instruction has a first bit 636, a second bit 638, and a third bit 640, although the scope of the invention is not so limited. These bits may optionally be in an immediate 642, although the scope of the invention is not so limited. In other embodiments, the instruction may have negation control with any of the features, characteristics, and variations previously described for the operation of FIG. 5, except that the negation control is applied to single scalar data elements in the source operations in this scalar embodiment. In the illustrated example embodiment, the first bit 636 is set to control negation of data element A, the second bit 638 is cleared to control no negation of the data element B, and the third bit 640 is set to control negation of data element C. Consequently, in this example, the result may store as a single result data element a first floating point rounded sum (e.g., $RND_1((-C)+RND_2((-A)+B))$). It is to be appreciated that which particular source operands are negated is only for illustration purposes and that in other embodiments source operands may be negated or not differently.

Table 3 provides a description of a particular example embodiment of a scalar three source double precision floating point masked and negation controlled addition instruction, which is named VADD3SD. In some embodiments, the instruction may have a format VADD3SD xmm1 {k1}{z}, xmm2, xmm3/m64, imm8 {er}. In some embodiments, the instruction may be encoded in EVEX as EVEX.U1.NDS.128.F3.0F3A.W1 69/r/is4.

TABLE 3

VADD3SD

| INSTRUCTION: | DESCRIPTION: |
|---|---|
| VADD3SD - FUSED ADD-ADD OF SCALAR DOUBLE PRECISION FLOATING-POINT VALUES | ADD SCALAR DOUBLE-PRECISION FLOATING POINT VALUE FROM EXPLICIT SECOND OPERAND (XMM2) WITH SCALAR DOUBLE-PRECISION FLOATING POINT VALUE FROM EXPLICIT THIRD OPERAND (XMM3 OR MEMORY64), RESULT WITH INTERMIEDIATE ROUNDING IS ADDED WITH SCALAR DOUBLE-PRECISION FLOATING-POINT VALUE FROM EXPLICIT FIRST OPERAND (XMM1), AND RESULT IS STORED IN IMPLICIT DESTINATION (XMM1) WHICH IS SAME AS FIRST OPERAND BASED ON EXPLICIT WRITEMASK K1. IMMEDIATE BITS [2:0] ARE USED AS NEGATION CONTROL TO CONTROL THE SIGN OF THE ADDITIONS. |

Listed below is pseudocode for the VADD3SD instruction. DEST is a first source operand and a destination operand. SRC2 is a second source operand. SRC3 is a third source operand. The EVEX.b bit is used for embedded rounding control and suppression of exceptions. The k1 is a source operation mask. IMM8 is an 8-bit immediate. In other embodiments, registers may be replaced by memory or other storage locations.

```
VADD3SD DEST, SRC2, SRC3
IF (EVEX.b == 1) AND SRC3 *is a register*
    THEN SET_RM(EVEX.RC);
    ELSE SET_RM(MXCSR.RM);
FI;
IF k1[0] OR *no writemask*
    THEN DEST[63:0] ←
        TMP_SRC2[63:0] =
        (IMM8[0])? -SRC2[63:0] : SRC2[63:0]
        TMP_SRC3[63:0] =
        (IMM8[1])? -SRC3[63:0] : SRC3[63:0]
        TMP_DEST[63:0] =
```

-continued

```
            (IMM8[2])? –DEST [63:0] : DEST[63:0]
            RoundFPControl(
                RoundFPControl(TMP_SRC2[63:0]+
                TMP_SRC3[63:0])+TMP_DEST[63:0])
    ELSE
        IF *merging-masking*; merging-masking
            THEN *DEST[63:0] remains unchanged*
            ELSE ; zeroing-masking
                DEST[63:0] ← 0
        FI
FI;
DEST[127:64] ← SRC1[127:64]
DEST[MAX_VL-1:128] ← 0
```

Table 4 provides a description of a particular example embodiment of a scalar three source single precision floating point masked and negation controlled addition instruction, which is named VADD3SS.

TABLE 4

VADD3SS

| INSTRUCTION: | DESCRIPTION: |
|---|---|
| VADD3SS - FUSED ADD-ADD OF SCALAR SINGLE PRECISION FLOATING-POINT VALUES | ADD SCALAR SINGLE-PRECISION FLOATING POINT VALUE FROM EXPLICIT SECOND OPERAND (XMM2) WITH SCALAR SINGLE-PRECISION FLOATING POINT VALUE FROM EXPLICIT THIRD OPERAND (XMM3 OR MEMORY64), RESULT WITH INTERMIEDIATE ROUNDING IS ADDED WITH SCALAR SINGLE-PRECISION FLOATING-POINT VALUE FROM EXPLICIT FIRST OPERAND (XMM1), AND RESULT IS STORED IN IMPLICIT DESTINATION (XMM1) WHICH IS SAME AS FIRST OPERAND BASED ON EXPLICIT WRITEMASK K1. IMMEDIATE BITS [2:0] ARE USED AS NEGATION CONTROL TO CONTROL THE SIGN OF THE ADDITIONS. |

The pseudocode for the VADD3SS instruction is similar to the pseudocode for the VADD3SD instruction listed above, except that 32-bit instead of 64-bit data elements are used. In other embodiments, registers may be replaced by memory or other storage locations.

These are just illustrative examples of suitable embodiments of instructions. Other embodiments may use different sizes of floating point data elements. Other embodiments may not use masking/predication. Other embodiments may not use negation control. Other embodiments may specify or indicate the source and/or destination operands differently.

Figure 7:
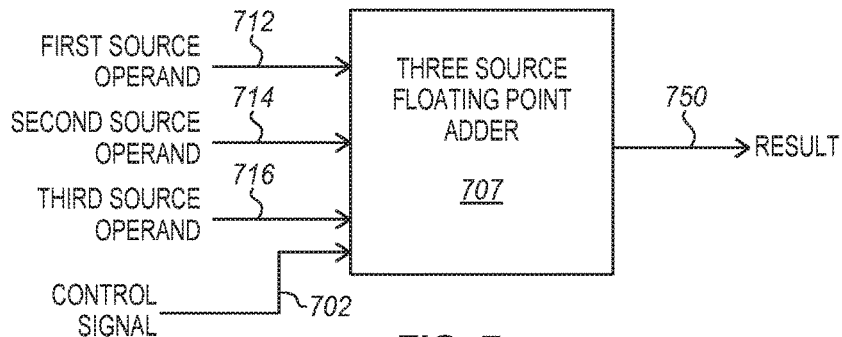
FIG. 7 is a block diagram of an embodiment of a three source floating point adder.

FIG. 7 is a block diagram of an embodiment of a three source floating point adder 707 to add three source floating point operands. In this embodiment, the three source floating point adder is able to concurrently receive and add a first source floating point operand 712, a second source floating point operand 714, and a third source floating point operand 716, and produce a potentially rounded result 750. The adder has inputs to receive the three source operands concurrently and is able to add them in generally one concurrent addition operation. In such embodiments, an intermediate rounding and normalization operation is generally not needed and is not performed. However, one potential drawback with such three source floating point adders is that they often tend to have relatively more complex designs, often tend to be large, often tend to consume relatively more power, and often tend to be rather specialized.

Many processors already have, or could readily have, one or more two source floating point adders that are each capable of adding together two source floating point operands concurrently, but which are not capable of adding together three source floating point operands concurrently. Examples of such adders include regular floating point adders, fused multiplier-adders, and the like. In some embodiments, such existing two source floating point adders may be used to implement the three source floating point addition instructions/operations disclosed herein to avoid needing to include a specialized three source floating point adder such as that of FIG. 7.

Figure 8:
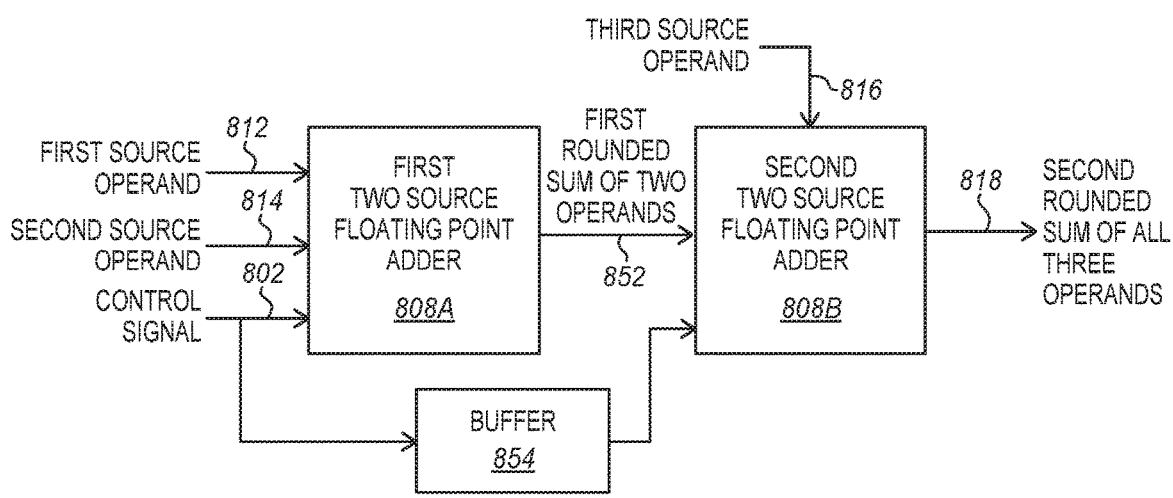
FIG. 8 is a block diagram of an embodiment of a pair of two source floating point adders coupled together in series.

FIG. 8 is a block diagram of an embodiment of a pair of two source floating point adders 808A, 808B coupled together in series to add three source floating point operands. By way of example, the adders may include floating point adders, floating point fused multiplier-adders, or the like. A first two source operand floating point adder 808A has inputs coupled to receive a first floating point operand 812 and a second floating point operand 814. The first two source operand floating point adder also has an input coupled to receive a control signal 802 corresponding to and/or derived from the three source floating point add instruction. For example, the control signal may be received from a reservation station (not shown). In some embodiments, the control signal, or an optionally simplified version thereof, may also optionally be provided to an optional buffer 854. The first two source operand floating point adder is capable of adding the first and second floating point operands to produce a first rounded sum 852 involving the first and second operands. The first rounded sum is rounded when appropriate according to a floating point rounding mode. The first two source operand floating point adder has an output to provide the first rounded sum. A second two source floating point adder 808B has an input coupled with the output of the first adder to receive the first rounded sum. The second two source floating point adder also has an input coupled to receive a third floating point operand 816. The second two source floating point adder also has an input coupled with an output of the buffer 854 to receive the control signal 802, or a simplified version thereof. The control signal may be stored in the buffer for a period of time while the first rounded sum is being generated by the first adder and then the control signal may be provided to the second adder along with the first rounded sum. The second two source operand floating point adder is capable of adding the third floating point operand and the first rounded sum to produce a second rounded sum 818 involving all three source floating point operands. The second two source operand floating point adder has an output to provide the second rounded sum. Advantageously, in this embodiment, three source floating point operands may be added together without needing to include a three source floating point adder, which may help to reduce complexity of design, size, and/or power consumption.

Figure 9:
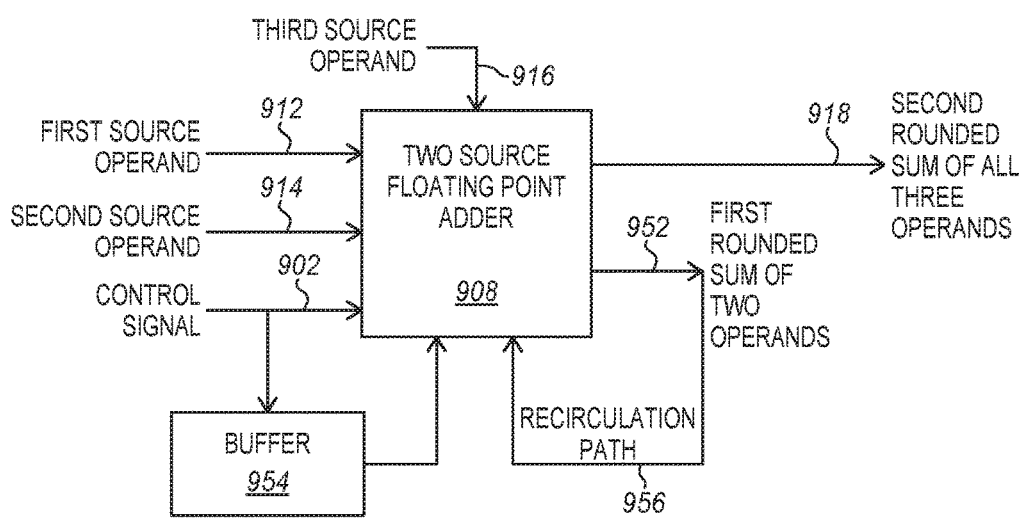
FIG. 9 is a block diagram of an embodiment of a two source floating point adder having a recirculation path that couples an output with an input.

FIG. 9 is a block diagram of an embodiment of a two source floating point adder 908 having a recirculation path 956 that couples an output of the adder with an input of the adder. By way of example, the adder may include a floating point adder, a floating point fused multiplier-adder, or the like. The two source operand floating point adder has first and second inputs coupled to receive a first floating point operand 912 and a second floating point operand 914. The two source operand floating point adder also has an input coupled to receive a control signal 902 corresponding to and/or derived from the three source floating point add instruction. For example, the control signal may be received from a reservation station (not shown). The two source operand floating point adder is capable of adding the first and second floating point operands to produce a first rounded sum 952 involving the first and second source operands. The first rounded sum is rounded when appropriate according to a floating point rounding mode. The two source operand floating point adder has an output coupled with a recirculation path 956. The recirculation path may couple or communicate the first rounded sum from the output of the adder to an input of the adder. The recirculation path may include circuitry, for example lines, wires, interconnects, conductive paths, or the like, to couple the first rounded sum from an output of the adder back to an input of the adder. The two source floating point adder also has an input coupled to receive a third floating point operand 916. The two source floating point adder also has an input coupled with an output of the buffer 954 to receive the control signal 902. The control signal may be stored in the buffer for a period of time while the first rounded sum is being generated by the adder and then the control signal may be provided to the adder along with the first rounded sum and the third source operand. The two source operand floating point adder is capable of adding the third floating point operand and the first rounded sum to produce a second rounded sum 918 involving all three source floating point operands. Notice that the same two source floating point adder is used for both sequential floating point addition operations. The two source operand floating point adder has an output to provide the second rounded sum 918. Advantageously, in this embodiment, three source floating point operands may be added together without needing to include a three source floating point adder, which may help to reduce complexity of design, size, and/or power consumption.

FIG. 10 is a block diagram of an embodiment of a suitable instruction format for a three source floating point addition instruction 1002. The instruction format includes an operation code or opcode 1060. The opcode may represent a plurality of bits or one or more fields that are operable to identify the instruction and/or the operation to be performed (e.g., three source floating point addition).

The instruction format also optionally includes a first source specifier 1061 to specify a first source operand, a second source specifier 1062 to specify a second source operand, a third source specifier 1063 to specify a third source operand, and a destination specifier 1064 to specify a destination operand where a result may be stored. By way of example, each of these specifiers may include bits or one or more fields to explicitly specify an address of a register, memory location, or other storage location for the associated operand. Alternatively, in another embodiment, one or more of the specifiers may optionally be implicit to the instruction, rather than being explicitly specified. For example, in some embodiments, instead of the destination specifier, a same storage location used for one of the source operands may optionally be implicitly used as the destination operand. By way of example, a source/destination register may initially have source data and later the source data may be overwritten with a result. Alternatively, in another embodiment, any one or more of the explicit specifiers may be replaced by an implicit operand.

In some embodiments, the instruction format may include an optional operation mask specifier 1065 to explicitly specify an operation mask (e.g., a mask register). Alternatively, the packed data operation mask may be implicitly indicated. In some embodiments, the instruction format may also include an optional type of masking operation specifier 1066 to specify a type of masking operation. By way of example, the type of masking operation specifier may include a single bit to specify whether merging-masking or zeroing-masking is to be performed. Alternatively, the type of masking operation may be implicitly indicated (e.g., by the opcode) or specified otherwise (e.g., in a control register). Other embodiments may not perform masking and may have no need for the mask specifier or type of masking specifier.

In some embodiments, the instruction format may include an optional floating point rounding mode specifier 1067 to specify a floating point rounding mode to be used in the operations disclosed herein. In some embodiments, the floating point rounding mode may override a mode in a floating point control register. Any of the various rounding modes mentioned herein, or others known in the arts, are suitable. The floating point rounding mode specifier is optional not required. In some embodiments, the rounding mode specifier may imply suppress all floating point exceptions, although this is not required.

In some embodiments, the instruction format may include an optional negation control specifier 1068 to specify negation control. In some embodiments, the negation control specifier may include bits of an immediate. Alternatively, bits in other portions of the instruction encoding may be used. The negation control specifier is optional not required.

It is to be appreciated that this is just one illustrative example. Alternate embodiments may include a subset of the specifiers, may add additional specifiers or fields, may overlap certain specifiers or fields, etc. In addition, the illustrated order/arrangement of the fields and is not required, but rather the fields may be rearranged, overlapped, fields need not include contiguous sequences of bits, but rather may include non-contiguous or separated bits, etc. In some embodiments, the instruction format may have a VEX or EVEX encoding or instruction format, which may have features described elsewhere herein, although the scope of the invention is not so limited. In some embodiments, in an EVEX encoding, the third source operand may be encoded in a reg_field, the first source operand may be encoded in VEX.vvvv, and the second source operand may be encoded using one of a portion of an eight bit immediate and an rm_field, although the scope of the invention is not so limited. In the case of the EVEX encoding, the static rounding mode control and implied suppress all exceptions may be enabled in the encoding of the instruction by setting the EVEX.b bit to 1 for register to register forms of the instructions.

Figure 11:
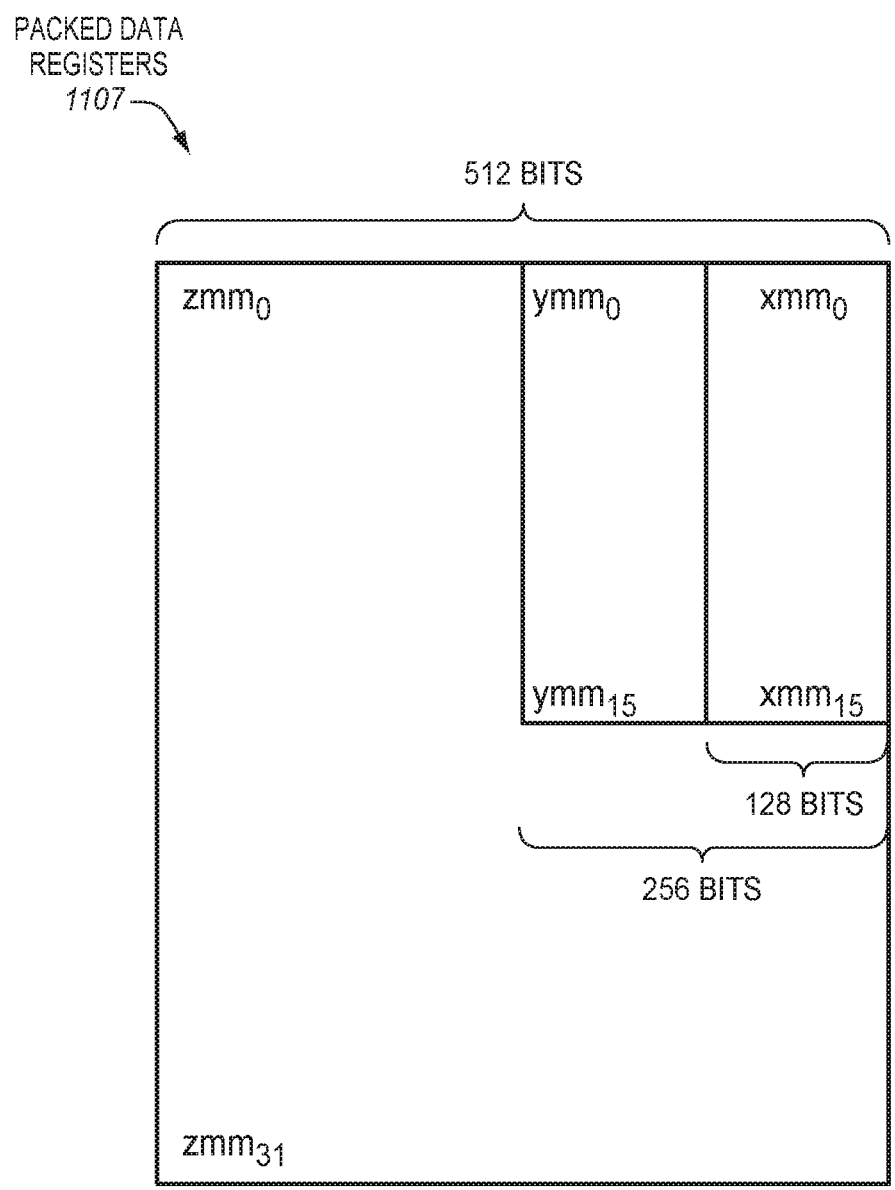
FIG. 11 is a block diagram of an embodiment of a suitable set of packed data registers.

FIG. 11 is a block diagram of an example embodiment of a suitable set of packed data registers 1110. The packed data registers include thirty-two 512-bit packed data registers labeled ZMM0 through ZMM31. In the illustrated embodiment, the lower order 256-bits of the lower sixteen registers, namely ZMM0-ZMM15, are aliased or overlaid on respective 256-bit packed data registers labeled YMM0-YMM15, although this is not required. Likewise, in the illustrated embodiment, the lower order 128-bits of the registers YMM0-YMM15 are aliased or overlaid on respective 128-bit packed data registers labeled XMM0-XMM15, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data or 128-bit packed data. The 128-bit registers XMM0-XMM15 are operable to hold 128-bit packed data. In some embodiments, each of the registers may be used to store either packed floating-point data or packed integer data. Different data element sizes are supported including at least 8-bit byte data, 16-bit word data, 32-bit doubleword, 32-bit single-precision floating point data, 64-bit quadword, and 64-bit double-precision floating point data. In alternate embodiments, different numbers of registers and/or different sizes of registers may be used. In still other embodiments, registers may or may not use aliasing of larger registers on smaller registers and/or may or may not be used to store floating point data.

Figures 12, 13:
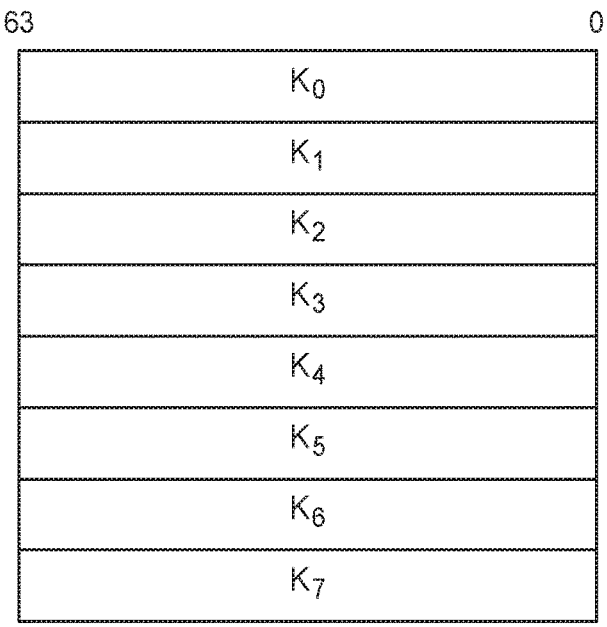
FIG. 12 is a table showing that a number of mask bits depends upon the packed data width and data element width.
FIG. 13 is a block diagram of an embodiment of a suitable set of operation mask registers.

FIG. 12 is a table 1270 illustrating that the number of packed data operation mask bits depends upon the packed data width and the packed data element width. Packed data widths of 128-bits, 256-bits, and 512-bits are shown, although other widths are also possible. Packed data element widths of 16-bit half precision, 32-bit single precision, and 64-bit double precision floating points formats are shown, although other widths are also possible. As one example, when the packed data width is 128-bits, 4-bits (e.g., a lowest order 4-bits of a register) may be used for masking when the packed data element width is 32-bits.

FIG. 13 is a block diagram of an example embodiment of a suitable set of operation mask registers 1320. Each of the packed data operation mask registers may be used to store a packed data operation mask. In the illustrated embodiment, the set includes eight registers labeled k0 through k7. Alternate embodiments may include either fewer than eight registers (e.g., two, four, six, etc.), or more than eight registers (e.g., sixteen, thirty-two, etc.). In the illustrated embodiment, each of the registers is 64-bits. In alternate embodiments, the widths of the registers may be either wider than 64-bits (e.g., 80-bits, 128-bits, etc.), or narrower than 64-bits (e.g., 8-bits, 16-bits, 32-bits, etc). The registers may be implemented in different ways using well known techniques and are not limited to any known particular type of circuit. Examples of suitable registers include, but are not limited to, dedicated physical registers, dynamically allocated physical registers using register renaming, and combinations thereof.

In some embodiments, the packed data operation mask registers 1320 may be a separate, dedicated set of architectural registers. In some embodiments, the instructions may encode or specify the packed data operation mask registers in different bits or one or more different fields of an instruction format than those used to encode or specify other types of registers (e.g., packed data registers). By way of example, an instruction may use three bits (e.g., a 3-bit field) to encode or specify any one of the eight packed data operation mask registers k0 through k7. In alternate embodiments, either fewer or more bits may be used, respectively, when there are fewer or more packed data operation mask registers. In one particular implementation, only packed data operation mask registers k1 through k7 (but not k0) may be addressed as a predicate operand to predicate a masked packed data operation. The register k0 may be used as a regular source or destination, but may not be encoded as a predicate operand (e.g., if k0 is specified it has a "no mask" encoding). However, this is optional and not required.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 14A:
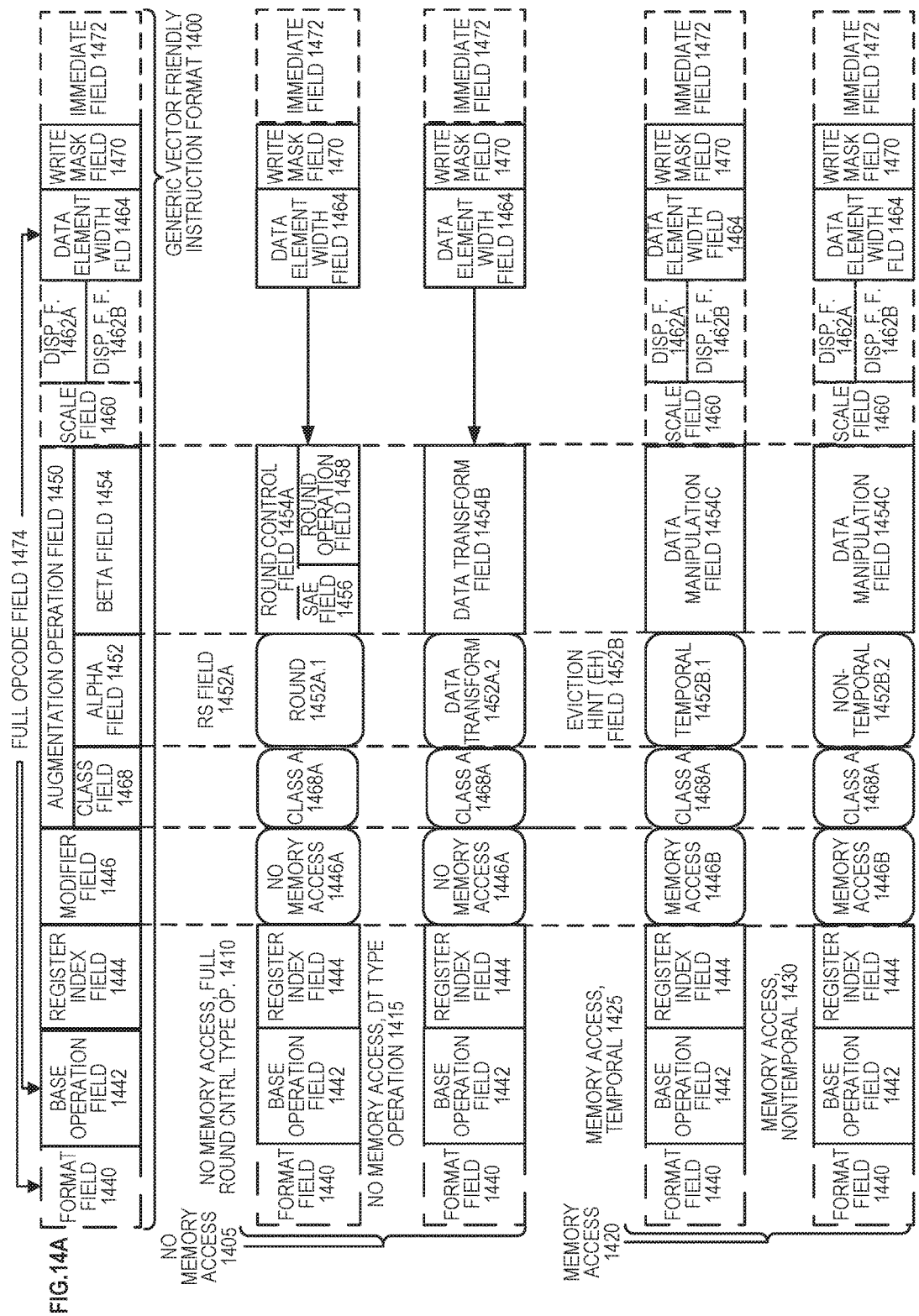
FIGS. 14A-14B are block diagrams illustrating a generic vector friendly instruction format and instruction templates thereof, according to embodiments of the invention.
Figure 14B:
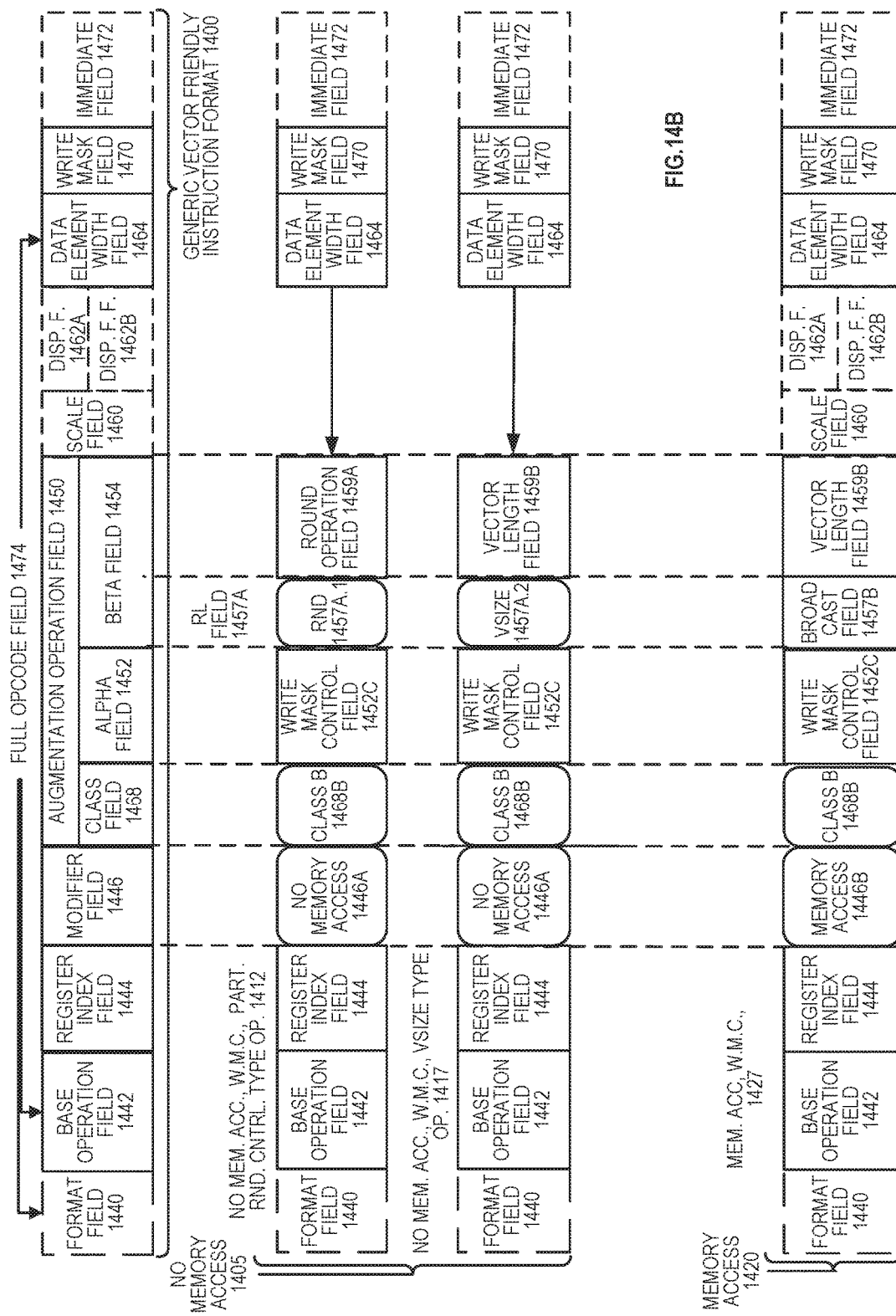

FIGS. 14A-14B are block diagrams illustrating a generic vector friendly instruction format and instruction templates thereof according to embodiments of the invention. FIG. 14A is a block diagram illustrating a generic vector friendly instruction format and class A instruction templates thereof according to embodiments of the invention; while FIG. 14B is a block diagram illustrating the generic vector friendly instruction format and class B instruction templates thereof according to embodiments of the invention. Specifically, a generic vector friendly instruction format 1400 for which are defined class A and class B instruction templates, both of which include no memory access 1405 instruction templates and memory access 1420 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 14A include: 1) within the no memory access 1405 instruction templates there is shown a no memory access, full round control type operation 1410 instruction template and a no memory access, data transform type operation 1415 instruction template; and 2) within the memory access 1420 instruction templates there is shown a memory access, temporal 1425 instruction template and a memory access, non-temporal 1430 instruction template. The class B instruction templates in FIG. 14B include: 1) within the no memory access 1405 instruction templates there is shown a no memory access, write mask control, partial round control type operation 1412 instruction template and a no memory access, write mask control, vsize type operation 1417 instruction template; and 2) within the memory access 1420 instruction templates there is shown a memory access, write mask control 1427 instruction template.

The generic vector friendly instruction format 1400 includes the following fields listed below in the order illustrated in FIGS. 14A-14B.

Format field 1440—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1442—its content distinguishes different base operations.

Register index field 1444—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1446—its content distinguishes occurrences of instructions in the generic vector instruction format that specify memory access from those that do not; that is, between no memory access 1405 instruction templates and memory access 1420 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1450—its content distinguishes which one of a variety of different operations to be performed in addition to the base operation. This field is context specific. In one embodiment of the invention, this field is divided into a class field 1468, an alpha field 1452, and a beta field 1454. The augmentation operation field 1450 allows common groups of operations to be performed in a single instruction rather than 2, 3, or 4 instructions.

Scale field 1460—its content allows for the scaling of the index field's content for memory address generation (e.g., for address generation that uses $2^{scale}*\text{index}+\text{base}$).

Displacement Field 1462A—its content is used as part of memory address generation (e.g., for address generation that uses $2^{scale}*\text{index}+\text{base}+\text{displacement}$).

Displacement Factor Field 1462B (note that the juxtaposition of displacement field 1462A directly over displacement factor field 1462B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1474 (described later herein) and the data manipulation field 1454C. The displacement field 1462A and the displacement factor field 1462B are optional in the sense that they are not used for the no memory access 1405 instruction templates and/or different embodiments may implement only one or none of the two.

Data element width field 1464—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1470—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1470 allows for partial vector operations, including loads, stores, arithmetic, logical, etc. While embodiments of the invention are described in which the write mask field's 1470 content selects one of a number of write mask registers that contains the write mask to be used (and thus the write mask field's 1470 content indirectly identifies that masking to be performed), alternative embodiments instead or additional allow the mask write field's 1470 content to directly specify the masking to be performed.

Immediate field 1472—its content allows for the specification of an immediate. This field is optional in the sense that is it not present in an implementation of the generic vector friendly format that does not support immediate and it is not present in instructions that do not use an immediate.

Class field 1468—its content distinguishes between different classes of instructions. With reference to FIGS. 14A-

B, the contents of this field select between class A and class B instructions. In FIGS. 14A-B, rounded corner squares are used to indicate a specific value is present in a field (e.g., class A 1468A and class B 1468B for the class field 1468 respectively in FIGS. 14A-B).

Instruction Templates of Class A

In the case of the non-memory access 1405 instruction templates of class A, the alpha field 1452 is interpreted as an RS field 1452A, whose content distinguishes which one of the different augmentation operation types are to be performed (e.g., round 1452A.1 and data transform 1452A.2 are respectively specified for the no memory access, round type operation 1410 and the no memory access, data transform type operation 1415 instruction templates), while the beta field 1454 distinguishes which of the operations of the specified type is to be performed. In the no memory access 1405 instruction templates, the scale field 1460, the displacement field 1462A, and the displacement scale filed 1462B are not present.

No-Memory Access Instruction Templates—Full Round Control Type Operation

In the no memory access full round control type operation 1410 instruction template, the beta field 1454 is interpreted as a round control field 1454A, whose content(s) provide static rounding. While in the described embodiments of the invention the round control field 1454A includes a suppress all floating point exceptions (SAE) field 1456 and a round operation control field 1458, alternative embodiments may support may encode both these concepts into the same field or only have one or the other of these concepts/fields (e.g., may have only the round operation control field 1458).

SAE field 1456—its content distinguishes whether or not to disable the exception event reporting; when the SAE field's 1456 content indicates suppression is enabled, a given instruction does not report any kind of floating-point exception flag and does not raise any floating point exception handler.

Round operation control field 1458—its content distinguishes which one of a group of rounding operations to perform (e.g., Round-up, Round-down, Round-towards-zero and Round-to-nearest). Thus, the round operation control field 1458 allows for the changing of the rounding mode on a per instruction basis. In one embodiment of the invention where a processor includes a control register for specifying rounding modes, the round operation control field's 1450 content overrides that register value.

No Memory Access Instruction Templates—Data Transform Type Operation

In the no memory access data transform type operation 1415 instruction template, the beta field 1454 is interpreted as a data transform field 1454B, whose content distinguishes which one of a number of data transforms is to be performed (e.g., no data transform, swizzle, broadcast).

In the case of a memory access 1420 instruction template of class A, the alpha field 1452 is interpreted as an eviction hint field 1452B, whose content distinguishes which one of the eviction hints is to be used (in FIG. 14A, temporal 1452B.1 and non-temporal 1452B.2 are respectively specified for the memory access, temporal 1425 instruction template and the memory access, non-temporal 1430 instruction template), while the beta field 1454 is interpreted as a data manipulation field 1454C, whose content distinguishes which one of a number of data manipulation operations (also known as primitives) is to be performed (e.g., no manipulation; broadcast; up conversion of a source; and down conversion of a destination). The memory access 1420 instruction templates include the scale field 1460, and optionally the displacement field 1462A or the displacement scale field 1462B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1452 is interpreted as a write mask control (Z) field 1452C, whose content distinguishes whether the write masking controlled by the write mask field 1470 should be a merging or a zeroing.

In the case of the non-memory access 1405 instruction templates of class B, part of the beta field 1454 is interpreted as an RL field 1457A, whose content distinguishes which one of the different augmentation operation types are to be performed (e.g., round 1457A.1 and vector length (VSIZE) 1457A.2 are respectively specified for the no memory access, write mask control, partial round control type operation 1412 instruction template and the no memory access, write mask control, VSIZE type operation 1417 instruction template), while the rest of the beta field 1454 distinguishes which of the operations of the specified type is to be performed. In the no memory access 1405 instruction templates, the scale field 1460, the displacement field 1462A, and the displacement scale filed 1462B are not present.

In the no memory access, write mask control, partial round control type operation 1410 instruction template, the rest of the beta field 1454 is interpreted as a round operation field 1459A and exception event reporting is disabled (a given instruction does not report any kind of floating-point exception flag and does not raise any floating point exception handler).

Round operation control field 1459A—just as round operation control field 1458, its content distinguishes which one of a group of rounding operations to perform (e.g., Round-up, Round-down, Round-towards-zero and Round-to-nearest). Thus, the round operation control field 1459A allows for the changing of the rounding mode on a per instruction basis. In one embodiment of the invention where a processor includes a control register for specifying rounding modes, the round operation control field's 1450 content overrides that register value.

In the no memory access, write mask control, VSIZE type operation 1417 instruction template, the rest of the beta field 1454 is interpreted as a vector length field 1459B, whose content distinguishes which one of a number of data vector lengths is to be performed on (e.g., 128, 256, or 512 byte).

In the case of a memory access 1420 instruction template of class B, part of the beta field 1454 is interpreted as a broadcast field 1457B, whose content distinguishes whether or not the broadcast type data manipulation operation is to be performed, while the rest of the beta field 1454 is interpreted the vector length field 1459B. The memory access 1420 instruction templates include the scale field 1460, and optionally the displacement field 1462A or the displacement scale field 1462B.

With regard to the generic vector friendly instruction format 1400, a full opcode field 1474 is shown including the format field 1440, the base operation field 1442, and the data element width field 1464. While one embodiment is shown where the full opcode field 1474 includes all of these fields, the full opcode field 1474 includes less than all of these fields in embodiments that do not support all of them. The full opcode field 1474 provides the operation code (opcode).

The augmentation operation field 1450, the data element width field 1464, and the write mask field 1470 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 15 is a block diagram illustrating an exemplary specific vector friendly instruction format according to embodiments of the invention. FIG. 15 shows a specific vector friendly instruction format 1500 that is specific in the sense that it specifies the location, size, interpretation, and order of the fields, as well as values for some of those fields. The specific vector friendly instruction format 1500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 14 into which the fields from FIG. 15 map are illustrated.

It should be understood that, although embodiments of the invention are described with reference to the specific vector friendly instruction format 1500 in the context of the generic vector friendly instruction format 1400 for illustrative purposes, the invention is not limited to the specific vector friendly instruction format 1500 except where claimed. For example, the generic vector friendly instruction format 1400 contemplates a variety of possible sizes for the various fields, while the specific vector friendly instruction format 1500 is shown as having fields of specific sizes. By way of specific example, while the data element width field 1464 is illustrated as a one bit field in the specific vector friendly instruction format 1500, the invention is not so limited (that is, the generic vector friendly instruction format 1400 contemplates other sizes of the data element width field 1464).

The generic vector friendly instruction format 1400 includes the following fields listed below in the order illustrated in FIG. 15A.

EVEX Prefix (Bytes 0-3) 1502—is encoded in a four-byte form.

Format Field 1440 (EVEX Byte 0, bits [7:0])—the first byte (EVEX Byte 0) is the format field 1440 and it contains 0x62 (the unique value used for distinguishing the vector friendly instruction format in one embodiment of the invention).

The second-fourth bytes (EVEX Bytes 1-3) include a number of bit fields providing specific capability.

REX field 1505 (EVEX Byte 1, bits [7-5])—consists of a EVEX.R bit field (EVEX Byte 1, bit [7]-R), EVEX.X bit field (EVEX byte 1, bit [6]-X), and 1457BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1410—this is the first part of the REX' field 1410 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD RIM field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1515 (EVEX byte 1, bits [3:0]-mmmm)—its content encodes an implied leading opcode byte (0F, 0F 38, or 0F 3).

Data element width field 1464 (EVEX byte 2, bit [7]-W)—is represented by the notation EVEX.W. EVEX.W is used to define the granularity (size) of the datatype (either 32-bit data elements or 64-bit data elements).

EVEX.vvvv 1520 (EVEX Byte 2, bits [6:3]-vvvv)—the role of EVEX.vvvv may include the following: 1) EVEX.v- vvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1520 encodes the 4 low-order bits of the first source register specifier stored in inverted (1s complement) form. Depending on the instruction, an extra different EVEX bit field is used to extend the specifier size to 32 registers.

EVEX.U 1468 Class field (EVEX byte 2, bit [2]-U)—If EVEX.U=0, it indicates class A or EVEX.U0; if EVEX.U=1, it indicates class B or EVEX.U1.

Prefix encoding field 1525 (EVEX byte 2, bits [1:0]-pp)— provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1452 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1454 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1410—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1470 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1530 (Byte 4) is also known as the opcode byte. Part of the opcode is specified in this field.

MOD R/M Field 1540 (Byte 5) includes MOD field 1542, Reg field 1544, and R/M field 1546. As previously described, the MOD field's 1542 content distinguishes between memory access and non-memory access operations. The role of Reg field 1544 can be summarized to two situations: encoding either the destination register operand or a source register operand, or be treated as an opcode extension and not used to encode any instruction operand. The role of R/M field 1546 may include the following: encoding the instruction operand that references a memory address, or encoding either the destination register operand or a source register operand.

Scale, Index, Base (SIB) Byte (Byte 6)—As previously described, the scale field's 1450 content is used for memory address generation. SIB.xxx 1554 and SIB.bbb 1556—the contents of these fields have been previously referred to with regard to the register indexes Xxxx and Bbbb.

Displacement field 1462A (Bytes 7-10)—when MOD field 1542 contains 10, bytes 7-10 are the displacement field 1462A, and it works the same as the legacy 32-bit displacement (disp32) and works at byte granularity.

Displacement factor field 1462B (Byte 7)—when MOD field 1542 contains 01, byte 7 is the displacement factor field 1462B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1462B is a reinterpretation of disp8; when using displacement factor field 1462B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1462B substitutes the legacy x86 instruction set 8-bit displacement. Thus, the displacement factor field 1462B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1472 operates as previously described.

Full Opcode Field

FIG. 15B is a block diagram illustrating the fields of the specific vector friendly instruction format 1500 that make up the full opcode field 1474 according to one embodiment of the invention. Specifically, the full opcode field 1474 includes the format field 1440, the base operation field 1442, and the data element width (W) field 1464. The base operation field 1442 includes the prefix encoding field 1525, the opcode map field 1515, and the real opcode field 1530.

Register Index Field

FIG. 15C is a block diagram illustrating the fields of the specific vector friendly instruction format 1500 that make up the register index field 1444 according to one embodiment of the invention. Specifically, the register index field 1444 includes the REX field 1505, the REX' field 1510, the MODR/M.reg field 1544, the MODR/M.r/m field 1546, the VVVV field 1520, xxx field 1554, and the bbb field 1556.

Augmentation Operation Field

FIG. 15D is a block diagram illustrating the fields of the specific vector friendly instruction format 1500 that make up the augmentation operation field 1450 according to one embodiment of the invention. When the class (U) field 1468 contains 0, it signifies EVEX.U0 (class A 1468A); when it contains 1, it signifies EVEX.U1 (class B 1468B). When U=0 and the MOD field 1542 contains 11 (signifying a no memory access operation), the alpha field 1452 (EVEX byte 3, bit [7]-EH) is interpreted as the rs field 1452A. When the rs field 1452A contains a 1 (round 1452A.1), the beta field 1454 (EVEX byte 3, bits [6:4]-SSS) is interpreted as the round control field 1454A. The round control field 1454A includes a one bit SAE field 1456 and a two bit round operation field 1458. When the rs field 1452A contains a 0 (data transform 1452A.2), the beta field 1454 (EVEX byte 3, bits [6:4]-SSS) is interpreted as a three bit data transform field 1454B. When U=0 and the MOD field 1542 contains 00, 01, or 10 (signifying a memory access operation), the alpha field 1452 (EVEX byte 3, bit [7]-EH) is interpreted as the eviction hint (EH) field 1452B and the beta field 1454 (EVEX byte 3, bits [6:4]-SSS) is interpreted as a three bit data manipulation field 1454C.

When U=1, the alpha field 1452 (EVEX byte 3, bit [7]-EH) is interpreted as the write mask control (Z) field 1452C. When U=1 and the MOD field 1542 contains 11 (signifying a no memory access operation), part of the beta field 1454 (EVEX byte 3, bit [4]-$S_0$) is interpreted as the RL field 1457A; when it contains a 1 (round 1457A.1) the rest of the beta field 1454 (EVEX byte 3, bit [6-5]-$S_{2-1}$) is interpreted as the round operation field 1459A, while when the RL field 1457A contains a 0 (VSIZE 1457.A2) the rest of the beta field 1454 (EVEX byte 3, bit [6-5]-$S_{2-1}$) is interpreted as the vector length field 1459B (EVEX byte 3, bit [6-5]-$L_{1-0}$)). When U=1 and the MOD field 1542 contains 00, 01, or 10 (signifying a memory access operation), the beta field 1454 (EVEX byte 3, bits [6:4]-SSS) is interpreted as the vector length field 1459B (EVEX byte 3, bit [6-5]-$L_{1-0}$) and the broadcast field 1457B (EVEX byte 3, bit [4]-B).

Exemplary Register Architecture

FIG. 16 is a block diagram of a register architecture 1600 according to one embodiment of the invention. In the embodiment illustrated, there are 32 vector registers 1610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1500 operates on these overlaid register file as illustrated in the below tables.

| Adjustable Vector Length | Class | Operations | Registers |
|---|---|---|---|
| Instruction Templates that do not include the vector length field 1459B | A (FIG. 14A; U = 0) | 1410, 1415, 1425, 1430 | zmm registers (the vector length is 64 byte) |
| | B (FIG. 14B; U = 1) | 1412 | zmm registers (the vector length is 64 byte) |
| Instruction templates that do include the vector length field 1459B | B (FIG. 14B; U = 1) | 1417, 1427 | zmm, ymm, or xmm registers (the vector length is 64 byte, 32 byte, or 16 byte) depending on the vector length field 1459B |

In other words, the vector length field 1459B selects between a maximum length and one or more other shorter lengths, where each such shorter length is half the length of the preceding length; and instructions templates without the vector length field 1459B operate on the maximum vector length. Further, in one embodiment, the class B instruction templates of the specific vector friendly instruction format 1500 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1615—in the embodiment illustrated, there are 8 write mask registers (k0 through k7), each 64 bits in size. In an alternate embodiment, the write mask registers 1615 are 16 bits in size. As previously described, in one embodiment of the invention, the vector mask register k0 cannot be used as a write mask; when the encoding that would normally indicate k0 is used for a write mask, it selects a hardwired write mask of 0xFFPF, effectively disabling write masking for that instruction.

General-purpose registers 1625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1645, on which is aliased the MMX packed integer flat register file 1650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 17A is a block diagram illustrating both an exemplary in-order pipeline and an exemplary register renaming, out-of-order issue/execution pipeline according to embodiments of the invention. FIG. 17B is a block diagram illustrating both an exemplary embodiment of an in-order architecture core and an exemplary register renaming, out-of-order issue/execution architecture core to be included in a processor according to embodiments of the invention. The solid lined boxes in FIGS. 17A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 17A, a processor pipeline 1700 includes a fetch stage 1702, a length decode stage 1704, a decode stage 1706, an allocation stage 1708, a renaming stage 1710, a scheduling (also known as a dispatch or issue) stage 1712, a register read/memory read stage 1714, an execute stage 1716, a write back/memory write stage 1718, an exception handling stage 1722, and a commit stage 1724.

FIG. 17B shows processor core 1790 including a front end unit 1730 coupled to an execution engine unit 1750, and both are coupled to a memory unit 1770. The core 1790 may be a reduced instruction set computing (RISC) core, a complex instruction set computing (CISC) core, a very long instruction word (VLIW) core, or a hybrid or alternative core type. As yet another option, the core 1790 may be a special-purpose core, such as, for example, a network or communication core, compression engine, coprocessor core, general purpose computing graphics processing unit (GPGPU) core, graphics core, or the like.

The front end unit 1730 includes a branch prediction unit 1732 coupled to an instruction cache unit 1734, which is coupled to an instruction translation lookaside buffer (TLB) 1736, which is coupled to an instruction fetch unit 1738, which is coupled to a decode unit 1740. The decode unit 1740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1790 includes a microcode ROM or other medium that stores microcode for certain macroinstructions (e.g., in decode unit 1740 or otherwise within the front end unit 1730). The decode unit 1740 is coupled to a rename/allocator unit 1752 in the execution engine unit 1750.

The execution engine unit 1750 includes the rename/allocator unit 1752 coupled to a retirement unit 1754 and a set of one or more scheduler unit(s) 1756. The scheduler unit(s) 1756 represents any number of different schedulers, including reservations stations, central instruction window, etc. The scheduler unit(s) 1756 is coupled to the physical register file(s) unit(s) 1758. Each of the physical register file(s) units 1758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1758 comprises a vector registers unit, a write mask registers unit, and a scalar registers unit. These register units may provide architectural vector registers, vector mask registers, and general purpose registers. The physical register file(s) unit(s) 1758 is overlapped by the retirement unit 1754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1754 and the physical register file(s) unit(s) 1758 are coupled to the execution cluster(s) 1760. The execution cluster(s) 1760 includes a set of one or more execution units 1762 and a set of one or more memory access units 1764. The execution units 1762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1756, physical register file(s) unit(s) 1758, and execution cluster(s) 1760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1764). It should also be understood that where separate pipelines are used, one or more of these pipelines may be out-of-order issue/execution and the rest in-order.

The set of memory access units 1764 is coupled to the memory unit 1770, which includes a data TLB unit 1772 coupled to a data cache unit 1774 coupled to a level 2 (L2) cache unit 1776. In one exemplary embodiment, the memory access units 1764 may include a load unit, a store address unit, and a store data unit, each of which is coupled to the data TLB unit 1772 in the memory unit 1770. The instruction cache unit 1734 is further coupled to a level 2 (L2) cache unit 1776 in the memory unit 1770. The L2 cache unit 1776 is coupled to one or more other levels of cache and eventually to a main memory.

By way of example, the exemplary register renaming, out-of-order issue/execution core architecture may implement the pipeline 1700 as follows: 1) the instruction fetch 1738 performs the fetch and length decoding stages 1702 and 1704; 2) the decode unit 1740 performs the decode stage 1706; 3) the rename/allocator unit 1752 performs the allocation stage 1708 and renaming stage 1710; 4) the scheduler unit(s) 1756 performs the schedule stage 1712; 5) the physical register file(s) unit(s) 1758 and the memory unit 1770 perform the register read/memory read stage 1714; the execution cluster 1760 perform the execute stage 1716; 6) the memory unit 1770 and the physical register file(s) unit(s) 1758 perform the write back/memory write stage 1718; 7) various units may be involved in the exception handling stage 1722; and 8) the retirement unit 1754 and the physical register file(s) unit(s) 1758 perform the commit stage 1724.

The core 1790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1790 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1734/1774 and a shared L2 cache unit 1776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 18B:
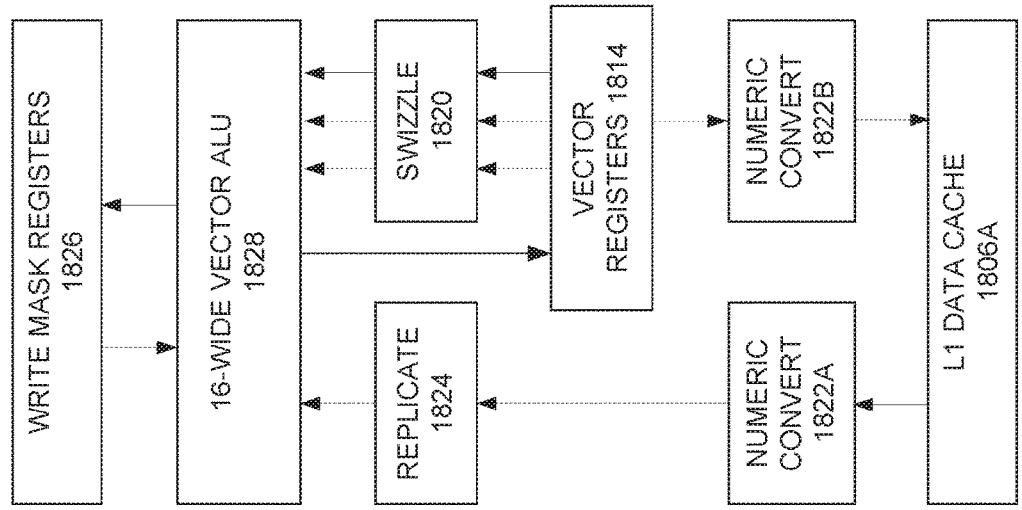
FIG. 18B is a block diagram of an embodiment of an expanded view of part of the processor core of FIG. 18A.
Figure 18A:
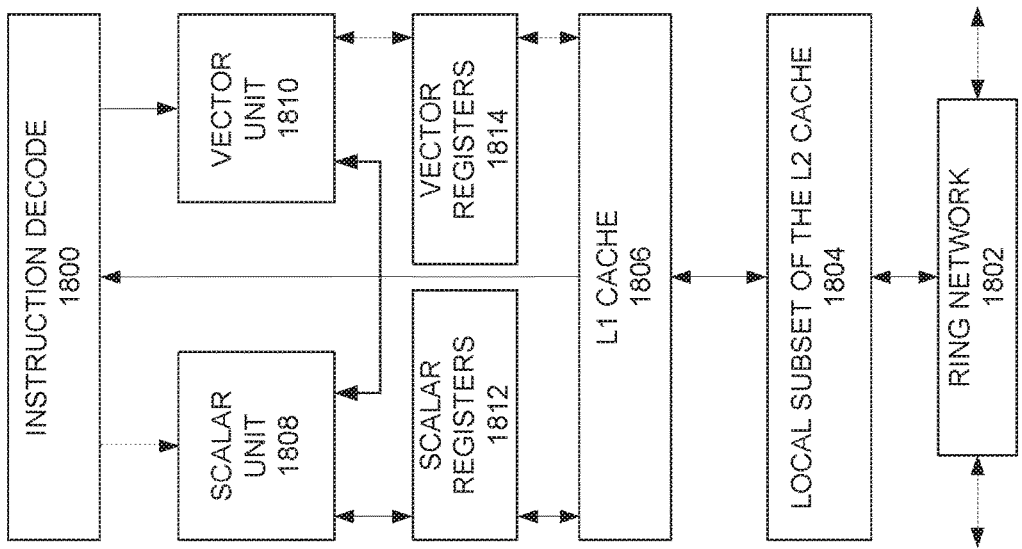
FIG. 18A is a block diagram of an embodiment of a single processor core, along with its connection to the on-die interconnect network, and with its local subset of the Level 2 (L2) cache.

FIGS. 18A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 18A is a block diagram of a single processor core, along with its connection to the on-die interconnect network 1802 and with its local subset of the Level 2 (L2) cache 1804, according to embodiments of the invention. In one embodiment, an instruction decoder 1800 supports the x86 instruction set with a packed data instruction set extension. An L1 cache 1806 allows low-latency accesses to cache memory into the scalar and vector units. While in one embodiment (to simplify the design), a scalar unit 1808 and a vector unit 1810 use separate register sets (respectively, scalar registers 1812 and vector registers 1814) and data transferred between them is written to memory and then read back in from a level 1 (L1) cache 1806, alternative embodiments of the invention may use a different approach (e.g., use a single register set or include a communication path that allow data to be transferred between the two register files without being written and read back).

The local subset of the L2 cache 1804 is part of a global L2 cache that is divided into separate local subsets, one per processor core. Each processor core has a direct access path to its own local subset of the L2 cache 1804. Data read by a processor core is stored in its L2 cache subset 1804 and can be accessed quickly, in parallel with other processor cores accessing their own local L2 cache subsets. Data written by a processor core is stored in its own L2 cache subset 1804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 18B is an expanded view of part of the processor core in FIG. 18A according to embodiments of the invention. FIG. 18B includes an L1 data cache 1806A part of the L1 cache 1804, as well as more detail regarding the vector unit 1810 and the vector registers 1814. Specifically, the vector unit 1810 is a 16-wide vector processing unit (VPU) (see the 16-wide ALU 1828), which executes one or more of integer, single-precision float, and double-precision float instructions. The VPU supports swizzling the register inputs with swizzle unit 1820, numeric conversion with numeric convert units 1822A-B, and replication with replication unit 1824 on the memory input. Write mask registers 1826 allow predicating resulting vector writes.

Processor with Integrated Memory Controller and Graphics

Figure 19:
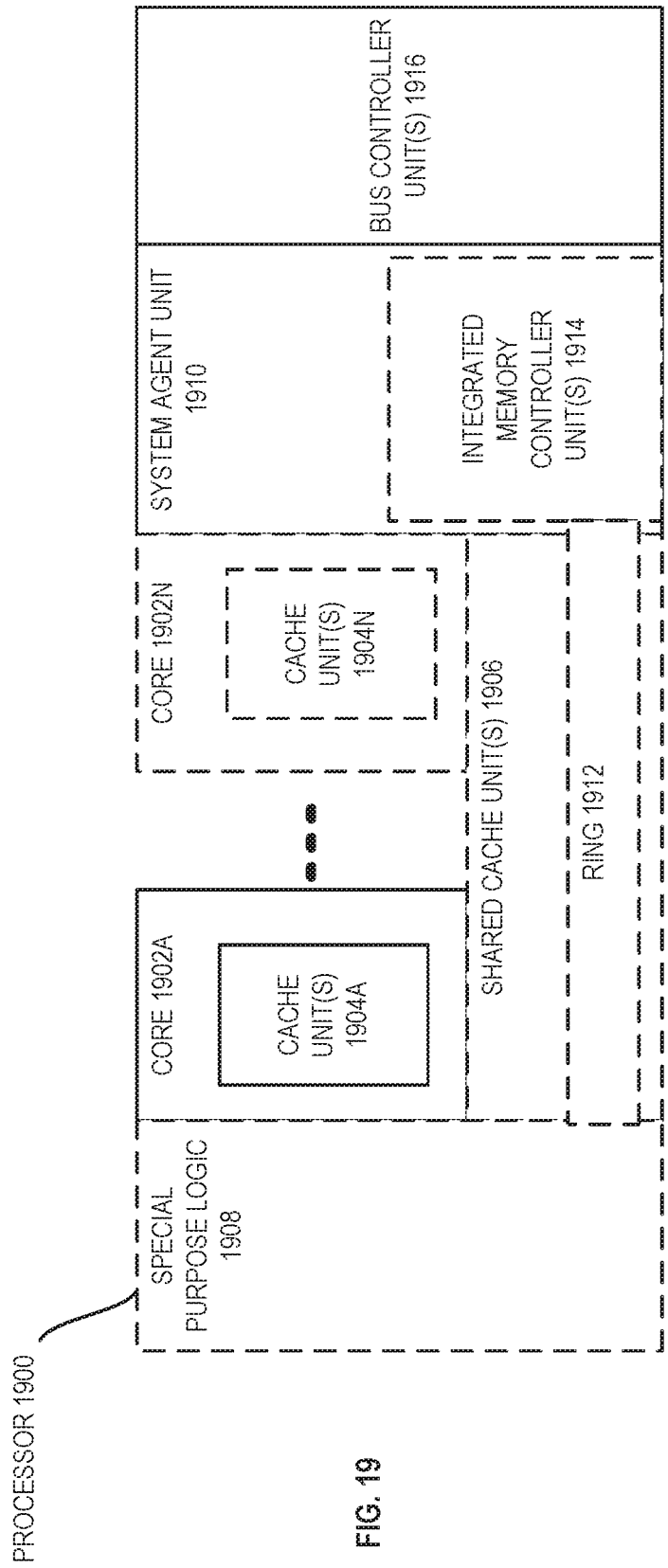
FIG. 19 is a block diagram of an embodiment of a processor that may have more than one core, may have an integrated memory controller, and may have integrated graphics.

FIG. 19 is a block diagram of a processor 1900 that may have more than one core, may have an integrated memory controller, and may have integrated graphics according to embodiments of the invention. The solid lined boxes in FIG. 19 illustrate a processor 1900 with a single core 1902A, a system agent 1910, a set of one or more bus controller units 1916, while the optional addition of the dashed lined boxes illustrates an alternative processor 1900 with multiple cores 1902A-N, a set of one or more integrated memory controller unit(s) 1914 in the system agent unit 1910, and special purpose logic 1908.

Thus, different implementations of the processor 1900 may include: 1) a CPU with the special purpose logic 1908 being integrated graphics and/or scientific (throughput) logic (which may include one or more cores), and the cores 1902A-N being one or more general purpose cores (e.g., general purpose in-order cores, general purpose out-of-order cores, a combination of the two); 2) a coprocessor with the cores 1902A-N being a large number of special purpose cores intended primarily for graphics and/or scientific (throughput); and 3) a coprocessor with the cores 1902A-N being a large number of general purpose in-order cores. Thus, the processor 1900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1906, and external memory (not shown) coupled to the set of integrated memory controller units 1914. The set of shared cache units 1906 may include one or more mid-level caches, such as level 2 (L2), level 3 (L3), level 4 (L4), or other levels of cache, a last level cache (LLC), and/or combinations thereof. While in one embodiment a ring based interconnect unit 1912 interconnects the integrated graphics logic 1908, the set of shared cache units 1906, and the system agent unit 1910/integrated memory controller unit(s) 1914, alternative embodiments may use any number of well-known techniques for interconnecting such units. In one embodiment, coherency is maintained between one or more cache units 1906 and cores 1902A-N.

In some embodiments, one or more of the cores 1902A-N are capable of multi-threading. The system agent 1910 includes those components coordinating and operating cores 1902A-N. The system agent unit 1910 may include for example a power control unit (PCU) and a display unit. The PCU may be or include logic and components needed for regulating the power state of the cores 1902A-N and the integrated graphics logic 1908. The display unit is for driving one or more externally connected displays.

The cores 1902A-N may be homogenous or heterogeneous in terms of architecture instruction set; that is, two or more of the cores 1902A-N may be capable of execution the same instruction set, while others may be capable of executing only a subset of that instruction set or a different instruction set.

Exemplary Computer Architectures

FIGS. 20-23 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 20:
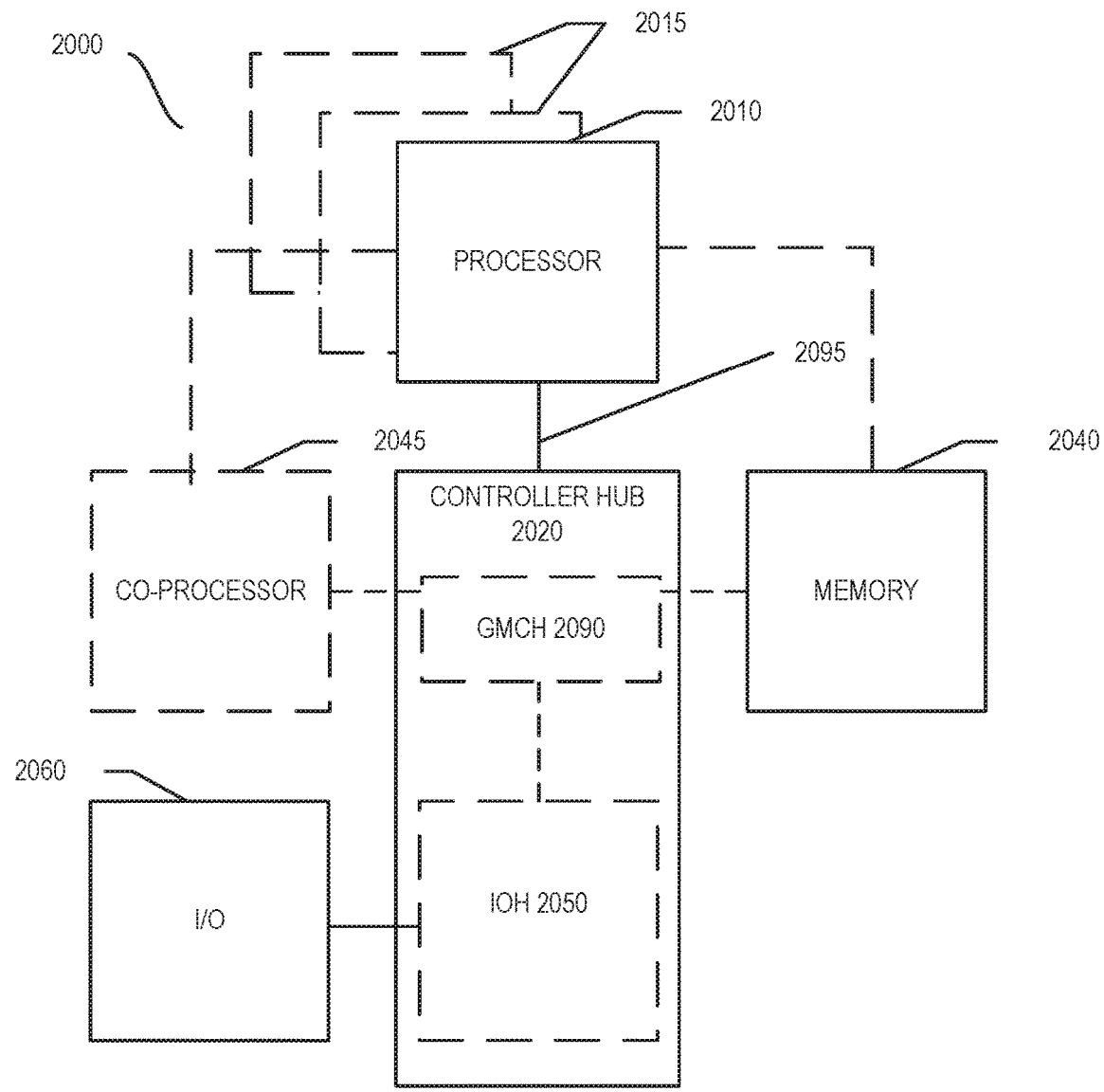
FIG. 20 is a block diagram of a first embodiment of a computer architecture.

Referring now to FIG. 20, shown is a block diagram of a system 2000 in accordance with one embodiment of the present invention. The system 2000 may include one or more processors 2010, 2015, which are coupled to a controller hub 2020. In one embodiment the controller hub 2020 includes a graphics memory controller hub (GMCH) 2090 and an Input/Output Hub (IOH) 2050 (which may be on separate chips); the GMCH 2090 includes memory and graphics controllers to which are coupled memory 2040 and a coprocessor 2045; the IOH 2050 is couples input/output (I/O) devices 2060 to the GMCH 2090. Alternatively, one or both of the memory and graphics controllers are integrated within the processor (as described herein), the memory 2040 and the coprocessor 2045 are coupled directly to the processor 2010, and the controller hub 2020 in a single chip with the IOH 2050.

The optional nature of additional processors 2015 is denoted in FIG. 20 with broken lines. Each processor 2010, 2015 may include one or more of the processing cores described herein and may be some version of the processor 1900.

The memory 2040 may be, for example, dynamic random access memory (DRAM), phase change memory (PCM), or a combination of the two. For at least one embodiment, the controller hub 2020 communicates with the processor(s) 2010, 2015 via a multi-drop bus, such as a frontside bus (FSB), point-to-point interface such as QuickPath Interconnect (QPI), or similar connection 2095.

In one embodiment, the coprocessor 2045 is a special-purpose processor, such as, for example, a high-throughput MIC processor, a network or communication processor, compression engine, graphics processor, GPGPU, embedded processor, or the like. In one embodiment, controller hub 2020 may include an integrated graphics accelerator.

There can be a variety of differences between the physical resources 2010, 2015 in terms of a spectrum of metrics of merit including architectural, microarchitectural, thermal, power consumption characteristics, and the like.

In one embodiment, the processor 2010 executes instructions that control data processing operations of a general type. Embedded within the instructions may be coprocessor instructions. The processor 2010 recognizes these coprocessor instructions as being of a type that should be executed by the attached coprocessor 2045. Accordingly, the processor 2010 issues these coprocessor instructions (or control signals representing coprocessor instructions) on a coprocessor bus or other interconnect, to coprocessor 2045. Coprocessor(s) 2045 accept and execute the received coprocessor instructions.

Figure 21:
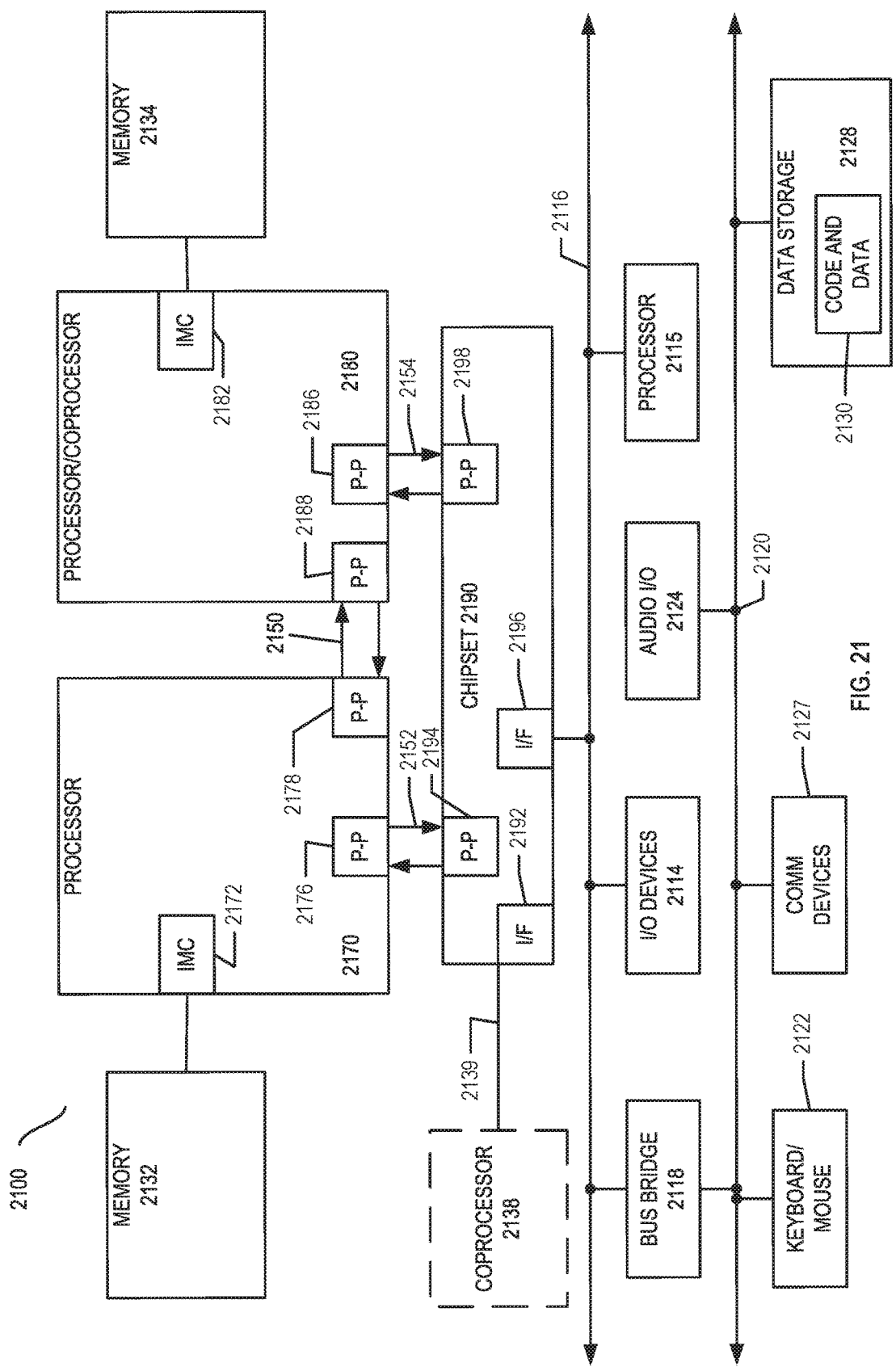
FIG. 21 is a block diagram of a second embodiment of a computer architecture.

Referring now to FIG. 21, shown is a block diagram of a first more specific exemplary system 2100 in accordance with an embodiment of the present invention. As shown in FIG. 21, multiprocessor system 2100 is a point-to-point interconnect system, and includes a first processor 2170 and a second processor 2180 coupled via a point-to-point interconnect 2150. Each of processors 2170 and 2180 may be some version of the processor 1900. In one embodiment of the invention, processors 2170 and 2180 are respectively processors 2010 and 2015, while coprocessor 2138 is coprocessor 2045. In another embodiment, processors 2170 and 2180 are respectively processor 2010 coprocessor 2045.

Processors 2170 and 2180 are shown including integrated memory controller (IMC) units 2172 and 2182, respectively. Processor 2170 also includes as part of its bus controller units point-to-point (P-P) interfaces 2176 and 2178; similarly, second processor 2180 includes P-P interfaces 2186 and 2188. Processors 2170, 2180 may exchange information via a point-to-point (P-P) interface 2150 using P-P interface circuits 2178, 2188. As shown in FIG. 21, IMCs 2172 and 2182 couple the processors to respective memories, namely a memory 2132 and a memory 2134, which may be portions of main memory locally attached to the respective processors.

Processors 2170, 2180 may each exchange information with a chipset 2190 via individual P-P interfaces 2152, 2154 using point to point interface circuits 2176, 2194, 2186, 2198. Chipset 2190 may optionally exchange information with the coprocessor 2138 via a high-performance interface 2139. In one embodiment, the coprocessor 2138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2190 may be coupled to a first bus 2116 via an interface 2196. In one embodiment, first bus 2116 may be a Peripheral Component Interconnect (PCI) bus, or a bus such as a PCI Express bus or another third generation I/O interconnect bus, although the scope of the present invention is not so limited.

As shown in FIG. 21, various I/O devices 2114 may be coupled to first bus 2116, along with a bus bridge 2118 which couples first bus 2116 to a second bus 2120. In one embodiment, one or more additional processor(s) 2115, such as coprocessors, high-throughput MIC processors, GPGPU's, accelerators (such as, e.g., graphics accelerators or digital signal processing (DSP) units), field programmable gate arrays, or any other processor, are coupled to first bus 2116. In one embodiment, second bus 2120 may be a low pin count (LPC) bus. Various devices may be coupled to a second bus 2120 including, for example, a keyboard and/or mouse 2122, communication devices 2127 and a storage unit 2128 such as a disk drive or other mass storage device which may include instructions/code and data 2130, in one embodiment. Further, an audio I/O 2124 may be coupled to the second bus 2120. Note that other architectures are possible. For example, instead of the point-to-point architecture of FIG. 21, a system may implement a multi-drop bus or other such architecture.

Figure 22:
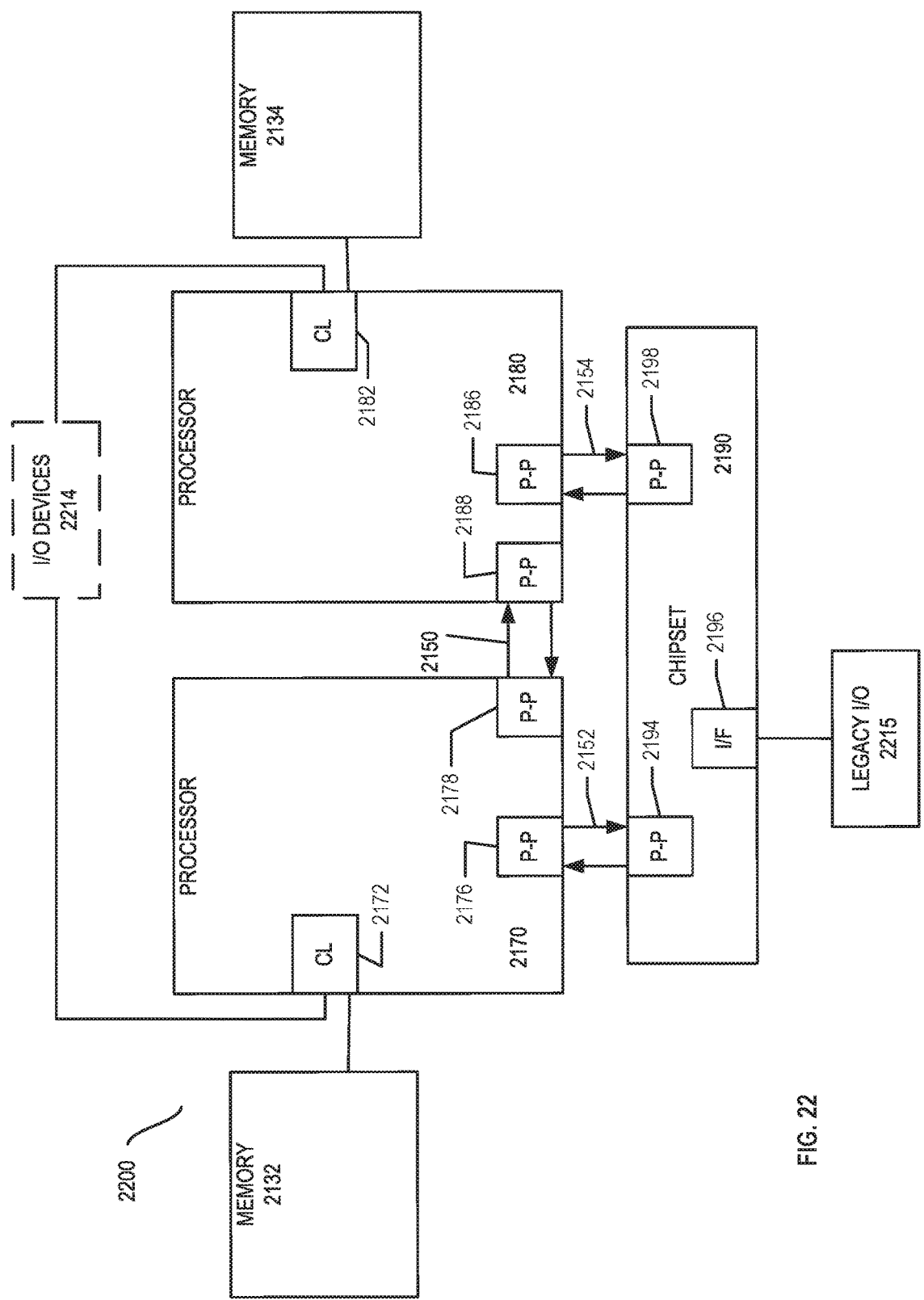
FIG. 22 is a block diagram of a third embodiment of a computer architecture.

Referring now to FIG. 22, shown is a block diagram of a second more specific exemplary system 2200 in accordance with an embodiment of the present invention. Like elements in FIGS. 21 and 22 bear like reference numerals, and certain aspects of FIG. 21 have been omitted from FIG. 22 in order to avoid obscuring other aspects of FIG. 22.

FIG. 22 illustrates that the processors 2170, 2180 may include integrated memory and I/O control logic ("CL") 2172 and 2182, respectively. Thus, the CL 2172, 2182 include integrated memory controller units and include I/O control logic. FIG. 22 illustrates that not only are the memories 2132, 2134 coupled to the CL 2172, 2182, but also that I/O devices 2214 are also coupled to the control logic 2172, 2182. Legacy I/O devices 2215 are coupled to the chipset 2190.

Referring now to FIG. 23, shown is a block diagram of a SoC 2300 in accordance with an embodiment of the present invention. Similar elements in FIG. 19 bear like reference numerals. Also, dashed lined boxes are optional features on more advanced SoCs. In FIG. 23, an interconnect unit(s) 2302 is coupled to: an application processor 2310 which includes a set of one or more cores 202A-N and shared cache unit(s) 1906; a system agent unit 1910; a bus controller unit(s) 1916; an integrated memory controller unit(s) 1914; a set or one or more coprocessors 2320 which may include integrated graphics logic, an image processor, an audio processor, and a video processor; an static random access memory (SRAM) unit 2330; a direct memory access (DMA) unit 2332; and a display unit 2340 for coupling to one or more external displays. In one embodiment, the coprocessor(s) 2320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2130 illustrated in FIG. 21, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 24 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 24 shows a program in a high level language 2402 may be compiled using an x86 compiler 2404 to generate x86 binary code 2406 that may be natively executed by a processor with at least one x86 instruction set core 2416. The processor with at least one x86 instruction set core 2416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2404 represents a compiler that is operable to generate x86 binary code 2406 (e.g., object code) that can, with or without additional linkage processing, be executed on the processor with at least one x86 instruction set core 2416. Similarly, FIG. 24 shows the program in the high level language 2402 may be compiled using an alternative instruction set compiler 2408 to generate alternative instruction set binary code 2410 that may be natively executed by a processor without at least one x86 instruction set core 2414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2412 is used to convert the x86 binary code 2406 into code that may be natively executed by the processor without an x86 instruction set core 2414. This converted code is not likely to be the same as the alternative instruction set binary code 2410 because an instruction converter capable of this is difficult to make; however, the converted code will accomplish the general operation and be made up of instructions from the alternative instruction set. Thus, the instruction converter 2412 represents software, firmware, hardware, or a combination thereof that, through emulation, simulation or any other process, allows a processor or other electronic device that does not have an x86 instruction set processor or core to execute the x86 binary code 2406.

Components, features, and details described for any of FIGS. 3-13 may also optionally be used in any of FIGS. 1-2. Moreover, components, features, and details described herein for any of the apparatus described herein may also optionally be used in and/or apply to any of the methods described herein, which in embodiments may be performed by and/or with such apparatus. Any of the processors described herein may be included in any of the computer systems or other systems disclosed herein. In some embodiments, the instructions may be encoded using features and details described for the instruction formats disclosed herein (e.g., VEX, EVEX, etc.), although the scope of the invention is not so limited.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise. Various operations and methods have been described. Some of the methods have been described in a relatively basic form in the flow diagrams, but operations may optionally be added to and/or removed from the methods.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may store or otherwise provide one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In another embodiment, the machine-readable medium may include a transitory machine-readable communication medium, for example, the electrical, optical, acoustical or other forms of propagated signals, such as carrier waves, infrared signals, digital signals, or the like.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit.

Examples of such computing devices and electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor including a plurality of registers, and a decode unit to decode a three source floating point addition instruction. The three source floating point addition instruction is to indicate a first source operand that is to have at least a first floating point data element, to indicate a second source operand that is to have at least a second floating point data element, and to indicate a third source operand that is to have at least a third floating point data element. An execution unit is coupled with the plurality of the registers and the decode unit. The execution unit, in response to the three source floating point addition instruction, is to store a result in a destination operand that is to be indicated by the three source floating point addition instruction. The result is to include at least a result floating point data element that is to correspond to the first, second, and third floating point data elements. The result floating point data element is to include a first floating point rounded sum. The first floating point rounded sum is to represent an additive combination of a second floating point rounded sum and the third floating point data element. The second floating point rounded sum to represent an additive combination of the first floating point data element and the second floating point data element.

Example 2 includes the processor of Example 1, in which the decode unit is to decode the three source floating point addition instruction which is to have: a first bit to specify whether all of one or more floating point data elements of the first source operand are to be negated; a second bit to specify whether all of one or more floating point data elements of the second source operand are to be negated; and a third bit to specify whether all of one or more floating point data elements of the third source operand are to be negated.

Example 3 includes the processor of Example 2, in which the first, second, and third bits comprise bits of an immediate of the three source floating point addition instruction.

Example 4 includes the processor of Example 1, in which the decode unit is to decode the three source floating point addition instruction which is to specify whether all of one or more floating point data elements of the first source operand are to be negated.

Example 5 includes the processor of Example 4, in which the decode unit is to decode the three source floating point addition instruction which is to specify whether all of one or more floating point data elements of the second source operand are to be negated.

Example 6 includes the processor of Example 5, in which the decode unit is to decode the three source floating point addition instruction which is to specify whether all of one or more floating point data elements of the third source operand are to be negated.

Example 7 includes the processor of any one of Examples 1 to 6, in which the decode unit is to decode the three source floating point addition instruction which is to indicate the first, second, and third source operands which are respectively to have the first, second, and third floating point data elements as scalar data elements that are each to be stored in a respective packed data register that is also to be capable at different times to store packed data. Also, the three source floating point addition instruction is to indicate a source predicate mask that is to have a mask element that is to correspond to, and is to predicate an operation of the three source floating point addition instruction on, the first, second, and third floating point data elements.

Example 8 includes the processor of any one of Examples 1 to 6, in which the decode unit is to decode the three source floating point addition instruction which is to indicate the first, second, and third source operands which are respectively to have a first plurality of packed data elements that is to include the first floating point data element, a second plurality of packed data elements that is to include the second floating point data element, and a third plurality of packed data elements that is to include the third floating point data element.

Example 9 includes the processor of Example 8, in which the decode unit is to decode the three source floating point addition instruction which is to indicate a source packed data operation mask that is to have a plurality of mask elements. Each of the mask elements is to correspond to, and to predicate a packed data operation of the three source floating point addition instruction on, corresponding floating point data elements of the first, second, and third source operands.

Example 10 includes the processor of any one of Examples 1 to 6, in which the execution unit is to use a rounding mode for the first and second floating point rounded sums which is to be one of: (1) round to nearest with ties to even; (2) round down toward negative infinity; (3) round up toward positive infinity; and (4) round toward zero with truncate. The decode unit is also optionally to decode the three source floating point addition instruction which is to specify the rounding mode. Also, the rounding mode is optionally to be specified by the instruction is to override a rounding mode in a floating point control register of the processor.

Example 11 includes the processor of any one of Examples 1 to 6, in which the execution unit includes a first floating point adder coupled to receive the first and second floating point data elements and to output the second floating point rounded sum. The execution unit also includes a second floating point adder coupled to receive the third floating point data element and the second floating point rounded sum, the second floating point adder to output the first floating point rounded sum.

Example 12 includes the processor of Example 11, further including a reservation station, and a buffer coupled with the reservation station. The buffer is to receive a control signal corresponding to the three source floating point addition instruction from the reservation station and to store the control signal during a period of time while the first floating point adder is to generate the second floating point rounded sum. The buffer is coupled with the second floating point adder to provide the control signal to the second floating point adder after the period of time.

Example 13 includes the processor of any one of Examples 1 to 6, in which the execution unit includes an output, an input, and circuitry coupling the output with the input.

Example 14 includes the processor of any one of Examples 1 to 6, in which the decode unit is to decode the three source floating point addition instruction which is to have an EVEX encoding in which the third source operand is to be encoded in a reg_field. Also optionally in which the first source operand is encoded in VEX.vvvv. Also optionally in which the second source operand is encoded using one of a portion of an eight bit immediate and an rm_field.

Example 15 is a method in a processor, the method including receiving a three source floating point addition instruction. The three source floating point addition instruction indicating a first source operand having at least a first floating point data element, indicating a second source operand having at least a second floating point data element, and indicating a third source operand having at least a third floating point data element. The method also includes storing a result in a destination operand in response to the three source floating point addition instruction. The destination operand is indicated by the three source floating point addition instruction. The result includes at least a result floating point data element that corresponds to the first, second, and third floating point data elements. The result floating point data element includes a first floating point rounded sum. The first floating point rounded sum represents an additive combination of a second floating point rounded sum and the third floating point data element. The second floating point rounded sum represents an additive combination of the first floating point data element and the second floating point data element.

Example 16 includes the method of Example 15, in which receiving includes receiving the three source floating point addition instruction which specifies whether all of one or more floating point data elements of the first source operand are to be negated. Optionally the instruction also specifies whether all of one or more floating point data elements of the second source operand are to be negated.

Example 17 includes the method of Example 15, in which receiving includes receiving the three source floating point addition instruction which specifies a rounding mode that is used for the first and second floating point rounded sums.

Example 18 includes the method of Example 15, in which receiving includes receiving the three source floating point addition instruction which indicates the first, second, and third source operands which respectively have the first, second, and third floating point data elements as scalar data elements each stored in a respective packed data register. The three source floating point addition instruction may also optionally indicate a source predicate mask.

Example 19 is a system to process instructions including an interconnect, and a processor coupled with the interconnect. The processor is to receive a three source floating point addition instruction. The three source floating point addition instruction is to indicate a first source operand that is to have at least a first floating point data element, to indicate a second source operand that is to have at least a second floating point data element, and to indicate a third source operand that is to have at least a third floating point data element. The processor, in response to the three source floating point addition instruction, is to store a result in a destination operand that is to be indicated by the three source floating point addition instruction. The result is to include at least a result floating point data element that is to correspond to the first, second, and third floating point data elements. The result floating point data element is to include a first floating point rounded sum. The first floating point rounded sum is to represent an additive combination of a second floating point rounded sum and the third floating point data element. The second floating point rounded sum is to represent an additive combination of the first floating point data element and the second floating point data element. The system also optionally includes a dynamic random access memory (DRAM) coupled with the interconnect.

Example 20 includes the system of Example 19, in which the three source floating point addition instruction is to specify whether all of one or more floating point data elements of the first source operand are to be negated.

Example 21 includes an article of manufacture including a machine-readable medium, which may optionally be a non-transitory machine-readable storage medium. The medium stores a three source floating point addition instruction. The three source floating point addition instruction is to indicate a first source operand that is to have at least a first floating point data element, to indicate a second source operand that is to have at least a second floating point data element, and to indicate a third source operand that is to have at least a third floating point data element. The three source floating point addition instruction if executed by a machine is to cause the machine to perform operations including storing a result in a destination operand in response to the three source floating point addition instruction. The destination operand is to be indicated by the three source floating point addition instruction. The result is to include at least a result floating point data element that is to correspond to the first, second, and third floating point data elements. The result floating point data element is to include a first floating point rounded sum, the first floating point rounded sum to represent an additive combination of a second floating point rounded sum and the third floating point data element. The second floating point rounded sum is to represent an additive combination of the first floating point data element and the second floating point data element.

Example 22 includes the article of manufacture of Example 21, in which the three source floating point addition instruction is to specify whether all of one or more floating point data elements of the first source operand are to be negated.

Example 23 is a processor including a plurality of registers, and a decode unit to decode a three source floating point addition instruction. The three source floating point addition instruction is to indicate a first source operand that is to have at least a first floating point data element, to indicate a second source operand that is to have at least a second floating point data element, and to indicate a third source operand that is to have at least a third floating point data element. The instruction is also optionally to have a first bit to specify whether all of one or more floating point data elements of the first source operand are to be negated and/or to have a second bit to specify whether all of one or more floating point data elements of the second source operand are to be negated. An execution unit is coupled with the plurality of the registers and the decode unit. The execution unit, in response to the three source floating point addition instruction, is to store a result in a destination operand that is to be indicated by the three source floating point addition instruction. The result is to include at least a result floating point data element that is to correspond to the first, second, and third floating point data elements. The result floating point data element is to include a floating point rounded sum that is to represent an additive combination of the first, second, and third floating point data elements.

Example 24 includes the processor of Example 23, in which the floating point rounded sum is to represent an additive combination of another floating point rounded sum.

Example 25 includes a processor or other apparatus that is operable to perform the method of any of Examples 15-18.

Example 26 includes a processor or other apparatus that includes means for performing the method of any of Examples 15-18.

Example 27 includes a processor that includes modules, units, logic, circuitry, means, or any combination thereof, to perform the method of any of Examples 15-18.

Example 28 includes a computer system or other electronic device including an interconnect, a processor coupled with the interconnect, and at least one component coupled with the interconnect that is selected from a DRAM, a graphics chip, a wireless communications chip, a phase change memory, and a video camera, the computer system or other electronic device to perform the method of any of Examples 15-18.

Example 29 includes a machine-readable medium, which is optionally a non-transitory machine-readable storage medium, that optionally stores or otherwise provides an instruction that if and/or when executed by a processor, computer system, or other machine is operable to cause the machine to perform the method of any of Examples 15-18.

Example 30 includes a processor or other apparatus that is operable to perform one or more operations or any method substantially as described herein.

Example 31 includes a processor or other apparatus including means for performing one or more operations or any method substantially as described herein.

Example 32 includes a processor or other apparatus that is operable to perform any of the instructions substantially as described herein.

Example 33 includes a processor or other apparatus including means for performing any of the instructions substantially as described herein.

Example 34 includes a method that includes converting a first instruction, which may be any of the instructions substantially as disclosed herein, and which is of a first instruction set, into one or more instructions of a second instruction set. The method also includes decoding and executing the one or more instructions of the second instruction set on a processor. The executing includes storing a result in a destination. The result may include any of the results substantially as disclosed herein for the first instruction.

Example 35 includes a processor or other apparatus including a decode unit that is operable to decode instructions of a first instruction set. The decode unit is to receive one or more instructions that emulate a first instruction, which may be any of the instructions substantially as disclosed herein, and which is to be of a second instruction set. The processor or other apparatus also includes one or more execution units coupled with the decode unit to execute the one or more instructions of the first instruction set. The one or more execution units in response to the one or more instructions of the first instruction set are operable to store a result in a destination. The result may include any of the results substantially as disclosed herein for the first instruction.

Example 36 includes a computer system or other electronic device that includes a processor having a decode unit that is operable to decode instructions of a first instruction set, and having one or more execution units. The computer system also includes a storage device coupled to the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when executed by the processor, are operable to cause the processor to store a result in a destination. The result may include any of the results substantially as disclosed herein for the first instruction.

What is claimed is:

1. A processor comprising:
   a plurality of registers;
   a decode unit to decode a three source floating point addition instruction, the three source floating point addition instruction to indicate a first source operand that is to have at least a first floating point data element, to indicate a second source operand that is to have at least a second floating point data element, and to indicate a third source operand that is to have at least a third floating point data element, wherein the decode unit is to decode the three source floating point addition instruction which is to have:
   a first bit to specify whether all of one or more floating point data elements of the first source operand are to be negated;
   a second bit to specify whether all of one or more floating point data elements of the second source operand are to be negated; and
   a third bit to specify whether all of one or more floating point data elements of the third source operand are to be negated; and
   an execution unit coupled with the plurality of registers and the decode unit, the execution unit, in response to the three source floating point addition instruction, to store a result in a destination operand that is to be indicated by the three source floating point addition instruction, the result to include at least a result floating point data element that is to correspond to the first, second, and third floating point data elements, the result floating point data element to include a first floating point rounded sum, the first floating point rounded sum to represent an additive combination of a second floating point rounded sum and the third floating point data element, the second floating point rounded sum to represent an additive combination of the first floating point data element and the second floating point data element.

2. The processor of claim 1, wherein the first, second, and third bits comprise bits of an immediate of the three source floating point addition instruction.

3. A processor comprising:
   a plurality of registers;
   a decode unit to decode a three source floating point addition instruction, the three source floating point addition instruction to indicate a first source operand that is to have at least a first floating point data element, to indicate a second source operand that is to have at least a second floating point data element, and to indicate a third source operand that is to have at least a third floating point data element, wherein the decode unit is to decode the three source floating point addition instruction which is to specify whether all of one or more floating point data elements of the first source operand are to be negated, and wherein the decode unit is to decode the three source floating point addition instruction which is to specify whether all of one or more floating point data elements of the second source operand are to be negated; and an execution unit coupled with the plurality of registers and the decode unit, the execution unit, in response to the three source floating point addition instruction, to store a result in a destination operand that is to be indicated by the three source floating point addition instruction, the result to include at least a result floating point data element that is to correspond to the first, second, and third floating point data elements, the result floating point data element to include a first floating point rounded sum, the first floating point rounded sum to represent an additive combination of a second floating point rounded sum and the third floating point data element, the second floating point rounded sum to represent an additive combination of the first floating point data element and the second floating point data element.

4. The processor of claim 3, wherein the decode unit is to decode the three source floating point addition instruction which is to specify whether all of one or more floating point data elements of the third source operand are to be negated.

5. The processor of claim 3, wherein the decode unit is to decode the three source floating point addition instruction which is to indicate the first, second, and third source operands which are respectively to have the first, second, and third floating point data elements as scalar data elements that are each to be stored in a respective packed data register that is also to be capable at different times to store packed data, and wherein the three source floating point addition instruction is to indicate a source predicate mask that is to have a mask element that is to correspond to, and is to predicate an operation of the three source floating point addition instruction on, the first, second, and third floating point data elements.

6. The processor of claim 3, wherein the decode unit is to decode the three source floating point addition instruction which is to indicate the first, second, and third source operands which are respectively to have a first plurality of packed data elements that is to include the first floating point data element, a second plurality of packed data elements that is to include the second floating point data element, and a third plurality of packed data elements that is to include the third floating point data element.

7. The processor of claim 6, wherein the decode unit is to decode the three source floating point addition instruction which is to indicate a source packed data operation mask that is to have a plurality of mask elements, each of the mask elements to correspond to, and to predicate a packed data operation of the three source floating point addition instruction on, corresponding floating point data elements of the first, second, and third source operands.

8. The processor of claim 3, wherein the execution unit is to use a rounding mode for the first and second floating point rounded sums which is to be one of: (1) round to nearest with ties to even; (2) round down toward negative infinity; (3) round up toward positive infinity; and (4) round toward zero with truncate, and wherein the decode unit is to decode the three source floating point addition instruction which is to specify the rounding mode, and wherein the rounding mode which is to be specified by the three source floating point addition instruction is to override a rounding mode in a floating point control register of the processor.

9. The processor of claim 3, wherein the execution unit comprises an output, an input, and circuitry coupling the output with the input.

10. The processor of claim 3, wherein the decode unit is to decode the three source floating point addition instruction which is to have an enhanced vector extension (EVEX) encoding.

11. A processor comprising:
a plurality of registers;
a decode unit to decode a three source floating point addition instruction, the three source floating point addition instruction to indicate a first source operand that is to have at least a first floating point data element, to indicate a second source operand that is to have at least a second floating point data element, and to indicate a third source operand that is to have at least a third floating point data element; and
an execution unit coupled with the plurality of registers and the decode unit, the execution unit, in response to the three source floating point addition instruction, to store a result in a destination operand that is to be indicated by the three source floating point addition instruction, the result to include at least a result floating point data element that is to correspond to the first, second, and third floating point data elements, the result floating point data element to include a first floating point rounded sum, the first floating point rounded sum to represent an additive combination of a second floating point rounded sum and the third floating point data element, the second floating point rounded sum to represent an additive combination of the first floating point data element and the second floating point data element, wherein the execution unit comprises:
a first floating point adder coupled to receive the first and second floating point data elements and to output the second floating point rounded sum; and
a second floating point adder coupled to receive the third floating point data element and the second floating point rounded sum, the second floating point adder to output the first floating point rounded sum;
a reservation station; and
a buffer coupled with the reservation station, the buffer to receive a control signal corresponding to the three source floating point addition instruction from the reservation station and to store the control signal during a period of time while the first floating point adder is to generate the second floating point rounded sum, the buffer coupled with the second floating point adder to provide the control signal to the second floating point adder after the period of time.

12. A method in a processor, the method comprising:
decoding, with a decode unit of the processor, a three source floating point addition instruction, the three source floating point addition instruction indicating a first source operand having at least a first floating point data element, indicating a second source operand having at least a second floating point data element, and indicating a third source operand having at least a third floating point data element, wherein the decoding comprises decoding the three source floating point addition instruction which specifies whether all of one or more floating point data elements of the first source operand are to be negated, and which specifies whether all of one or more floating point data elements of the second source operand are to be negated; and storing a result in a destination operand in response to the three source floating point addition instruction, with an execution unit of the processor, the destination operand indicated by the three source floating point addition instruction, the result including at least a result floating point data element that corresponds to the first, second, and third floating point data elements, the result floating point data element including a first floating point rounded sum, the first floating point rounded sum representing an additive combination of a second floating point rounded sum and the third floating point data element, the second floating point rounded sum representing an additive combination of the first floating point data element and the second floating point data element.

13. The method of claim 12, wherein the three source floating point addition instruction specifies a rounding mode that is used for the first and second floating point rounded sums.

14. The method of claim 12, wherein the three source floating point addition instruction indicates the first, second, and third source operands which respectively have the first, second, and third floating point data elements as scalar data elements each stored in a respective packed data register, and wherein the three source floating point addition instruction indicates a source predicate mask.

15. A processor comprising:
a plurality of registers;
a decode unit to decode a three source floating point addition instruction, the three source floating point addition instruction to indicate a first source operand that is to have at least a first floating point data element, to indicate a second source operand that is to have at least a second floating point data element, to indicate a third source operand that is to have at least a third floating point data element, to have a first bit to specify whether all of one or more floating point data elements of the first source operand are to be negated, and to have a second bit to specify whether all of one or more floating point data elements of the second source operand are to be negated; and an execution unit coupled with the plurality of registers and the decode unit, the execution unit, in response to the three source floating point addition instruction, to store a result in a destination operand that is to be indicated by the three source floating point addition instruction, the result to include at least a result floating point data element that is to correspond to the first, second, and third floating point data elements, the result floating point data element to include a floating point rounded sum that is to represent an additive combination of the first, second, and third floating point data elements.

16. The processor of claim 15, wherein the decode unit is to decode the three source floating point addition instruction which is to have a third bit to specify whether all of one or more floating point data elements of the third source operand are to be negated.

17. The processor of claim 15, wherein the first and second bits comprise bits of an immediate.

18. The processor of claim 15, wherein the decode unit is to decode the three source floating point addition instruction which is to indicate the first, second, and third source operands which are respectively to have the first, second, and third floating point data elements as scalar data elements that are each to be stored in a respective packed data register that is also to be capable at different times to store packed data, and wherein the three source floating point addition instruction is to indicate a source predicate mask that is to have a mask element that is to correspond to, and is to predicate an operation of the three source floating point addition instruction on, the first, second, and third floating point data elements.

19. The processor of claim 15, wherein the decode unit is to decode the three source floating point addition instruction which is to indicate the first, second, and third source operands which are respectively to have a first plurality of packed data elements that is to include the first floating point data element, a second plurality of packed data elements that is to include the second floating point data element, and a third plurality of packed data elements that is to include the third floating point data element.

* * * * *